United States Patent
Barnes

(10) Patent No.: US 7,289,285 B2
(45) Date of Patent: Oct. 30, 2007

(54) INFORMATION STORAGE SYSTEMS

(76) Inventor: Charles Frederick James Barnes, 13 Linton Cresent, Hastings, East Sussex (GB) Tn34 1TJ (*) Notice: Subject to any disclaimer, the term of this patent is extended or adjusted under 35 U.S.C. 154(b) by 215 days.

(21) Appl. No.: 10/690,569

(22) Filed: Oct. 23, 2003

(65) Prior Publication Data
US 2004/0130815 A1 Jul. 8, 2004

Related U.S. Application Data

(60) Provisional application No. 60/420,775, filed on Oct. 24, 2002.

(51) Int. Cl.
*G11B 5/02* (2006.01)

(52) U.S. Cl. .................... 360/59; 360/31; 360/245.9; 360/246.1; 360/246.6; 428/846.9

(58) Field of Classification Search .................... None
See application file for complete search history.

(56) References Cited

U.S. PATENT DOCUMENTS

| | | | |
|---|---|---|---|
| 4,636,893 A * | 1/1987 | McClure | 360/101 |
| 4,903,151 A | 2/1990 | Mizukami et al. | |
| 5,041,932 A * | 8/1991 | Hamilton | 360/246.1 |
| 5,212,680 A | 5/1993 | Toupin | |
| 5,227,211 A | 7/1993 | Eltoukhy et al. | |
| 5,264,975 A | 11/1993 | Bajoreket et al. | |
| 5,402,293 A * | 3/1995 | Smith | 369/13.1 |
| 5,528,819 A * | 6/1996 | McKay et al. | 29/603.07 |
| 5,606,474 A * | 2/1997 | Ketchersid, III | 360/98.01 |
| 5,729,408 A * | 3/1998 | Kikitsu | 360/294.7 |
| 5,739,975 A * | 4/1998 | Parks et al. | 360/81 |
| 5,995,338 A | 11/1999 | Watanabe et al. | |

(Continued)

FOREIGN PATENT DOCUMENTS

| | | |
|---|---|---|
| EP | 0 463 908 | 6/1991 |
| EP | 0 895 237 | 2/1999 |
| EP | 1 114 393 | 7/2001 |
| EP | 1 156 479 | 11/2001 |
| EP | 1 381 031 | 1/2004 |
| EP | 1381031 A1 * | 1/2004 |
| GB | 2178569 A * | 2/1987 |
| WO | WO 2004/032115 A1 | 4/2004 |

OTHER PUBLICATIONS

Glass Subtrate for Magnetic Disk in HDD, Information Sheet, ☐☐http://www7.big.or.jp/~cgi19786/ngf/nglass/ng06e.hmtl.*

(Continued)

*Primary Examiner*—Andrea Wellington
*Assistant Examiner*—Dismery Mercedes
(74) *Attorney, Agent, or Firm*—Sughrue Mion Pllc.

(57) ABSTRACT

An information storage apparatus includes a storage media including a plurality of information tracks. Each storage medium has a head assembly having a substantially planar surface and a plurality of read/write heads positioned in registry with the information tracks. The read/write heads are arranged substantially in the plane of the planar surface. The information storage medium and the head assembly are arranged in mutually sliding abutment such that the heads are substantially in sliding contact with the outer surface of the information storage medium. In another aspect an information storage and retrieval apparatus includes an information storage medium including an information storage area, and an array of information read/write heads. The information storage medium and array of heads are arranged to be oscillated with respect to each other in use such that each region of the information storage area is aligned with at least one of the heads during oscillation.

29 Claims, 21 Drawing Sheets

U.S. PATENT DOCUMENTS

| | | | |
|---|---|---|---|
| 6,078,454 A * | 6/2000 | Takahashi et al. | 360/66 |
| 6,078,471 A * | 6/2000 | Fiske | 360/254.2 |
| 6,081,402 A * | 6/2000 | Cho | 360/77.04 |
| 6,141,182 A * | 10/2000 | Amemiya et al. | 360/246.1 |
| 6,229,304 B1 * | 5/2001 | Guzik | 324/212 |
| 6,272,083 B1 | 8/2001 | Aratani | |
| 6,320,725 B1 | 11/2001 | Payne et al. | |
| 6,330,134 B2 * | 12/2001 | Kameyama | 360/245.4 |
| 6,335,850 B1 * | 1/2002 | Dunfield et al. | 360/294.5 |
| 6,353,317 B1 | 3/2002 | Green et al. | |
| 6,430,006 B2 * | 8/2002 | Kameyama | 360/245.1 |
| 6,493,191 B1 * | 12/2002 | Cain et al. | 360/246.2 |
| 6,538,854 B2 * | 3/2003 | Koganezawa et al. | 360/294.4 |
| 6,678,102 B1 * | 1/2004 | Liikanen et al. | 360/31 |
| 6,760,172 B1 * | 7/2004 | Hamaguchi et al. | 360/48 |
| 2001/0021159 A1 * | 9/2001 | Aratani | 369/95 |
| 2001/0055702 A1 * | 12/2001 | Wang et al. | 428/694 TP |

OTHER PUBLICATIONS

Carley et al, *Communication of the ACM*, 43(11):73-80 (2000).

Solin et al, "Giant Magneto Resistance in Zero-gap HgCdTe", www.neci.nj.nec.com/homepages/thio/gmr.htm.

"Composite Diamond Coating", Information Sheet, www.surfacetechnology.com.

"Artificial Diamond Coating and Thin Film Technologies", Information Sheet, Technologies of RRC Kurchatov Institute www.kiae.ru/eng/str/technology/t8.html.

Diamond Films for Microelectromechanical Systems (MEMS), Information Sheet, www.techtransfer.anl.gov/techtour/diamondmems.html.

Mohn, *Nature*, 400: 18-19 (1999).

Glass Substrate for Magnetic Disk in HDD, Information sheet, http://www7.big.or.jp/~cgi19786/ngf/nglass/ng06e.hmtl.

"Zero Expansion Glass and Glass Ceramics", Information sheet, http://www7.big.or.jp/~cgi19786/ngf/nglass/ng06e.hmtl.

"Ultra Low Expansion Glass", Information sheet, www.pgo-online.com/intl/jse/frameroute/genericset.html?Content=/intl/katalog/ule.hmtl.

Aschke, "Fit for Future Chip Technology", Company Profile on Schnott Lithotec, hppt://www.schott.com/magazine/English/download/info99/si099_02_euvl.pdf.

"Controlled Expansion Alloys", Comparison Table from Daido-Special Metals LTD, http://www.dsml.co.jp/english/controlled_expansion.htm.

McDaniel, "Vsuvius Zyarock", A Cookson Company Information Sheet, hppt://www.techceramics.com/fusedsilica.html.

Thermal Properties, GE Quartz, http://www.gequartz.com/en/thermal.htm.

"The Art of the Quantum Leap", Economist Story, http://www.economist.com/science/tq/displayStory.cfm? Story_ID=885080.

"Giant Magnetoresistance", http://srdweb2.dl.ac.uk/srs/other/ow/MAGNETISM/Giant_Magneto.html.

"Lubricants for disks", http://www.almaden.ibm.com/st/projects/lubricants/lube/.

"M5.004 Challenges of Head-Disk Interface Tribiology for Ultrahigh Density Magnetic Recording", Invited Session by Jing Gui; http://www.eps.org/aps/meet/MAROO/baps/abs/S4840004.html.

"Tribology of Magnetic Media and Recording Technologies".

"Technology Research and Development—Basics of Magnetic Recording", http://www.infomrt.com/readrite/magbasis.html.

"HMT Delivers Volume Shipments of Advanced GMR Media to Maxtor", http://www.semiconductorfabtech.com/industry.news/9911/10.02.shtml.

"Evolution of HSS Head".

"Technology", Headway Technologies, http://www.hdwy.com/technology/technology.hmtl.

Caruso et al, "A New Perspective on Magnetic Field Sensing", http://www.et.byu.edu/eit444/Links/SensorsDec1998/SensorsMagFieldDec1998.shtml.

Singer, "Hard Disk Recording Aims to Get Perpendicular", http://www.reed-electronics.com/semiconductor/article/CA240215?text=hard+disk+recording+aims+to+get+perpendicular.

Brain, "How Hard Disks Work", www.howstuffworks.com/hard-disk.htm.

Fujitsu and Sony Develop World's First 1.3GB 3.5-inch MO Disk System Prototype; http://pr.fujitsu.com/jp/news/1998/Nov/5-e.hmtl.

"Hard Disk Tutorial", http://stweb.peel.edu.on.ca/pcsweb/Pc_tut/04disks.htm.

"Giant Magnetoresistance When Big Hard Drives Aren't Big Enough", http://www.wired.con/archive/4.05/geek/hmtl.

"Headway Technologies", http://www.hdwy.com/technology/technology.html.

"Single vs. Multiple Actuators", http://www.pcguide.com/ref/hdd/op/actMultiple-c.html.

"Storage/Hard Disks", http://www.pctechguide.com/04disks.htm.

"What is RAID?", http://www.uni-mainz.de/~neuffer/scsi/what_is_raid.html.

* cited by examiner

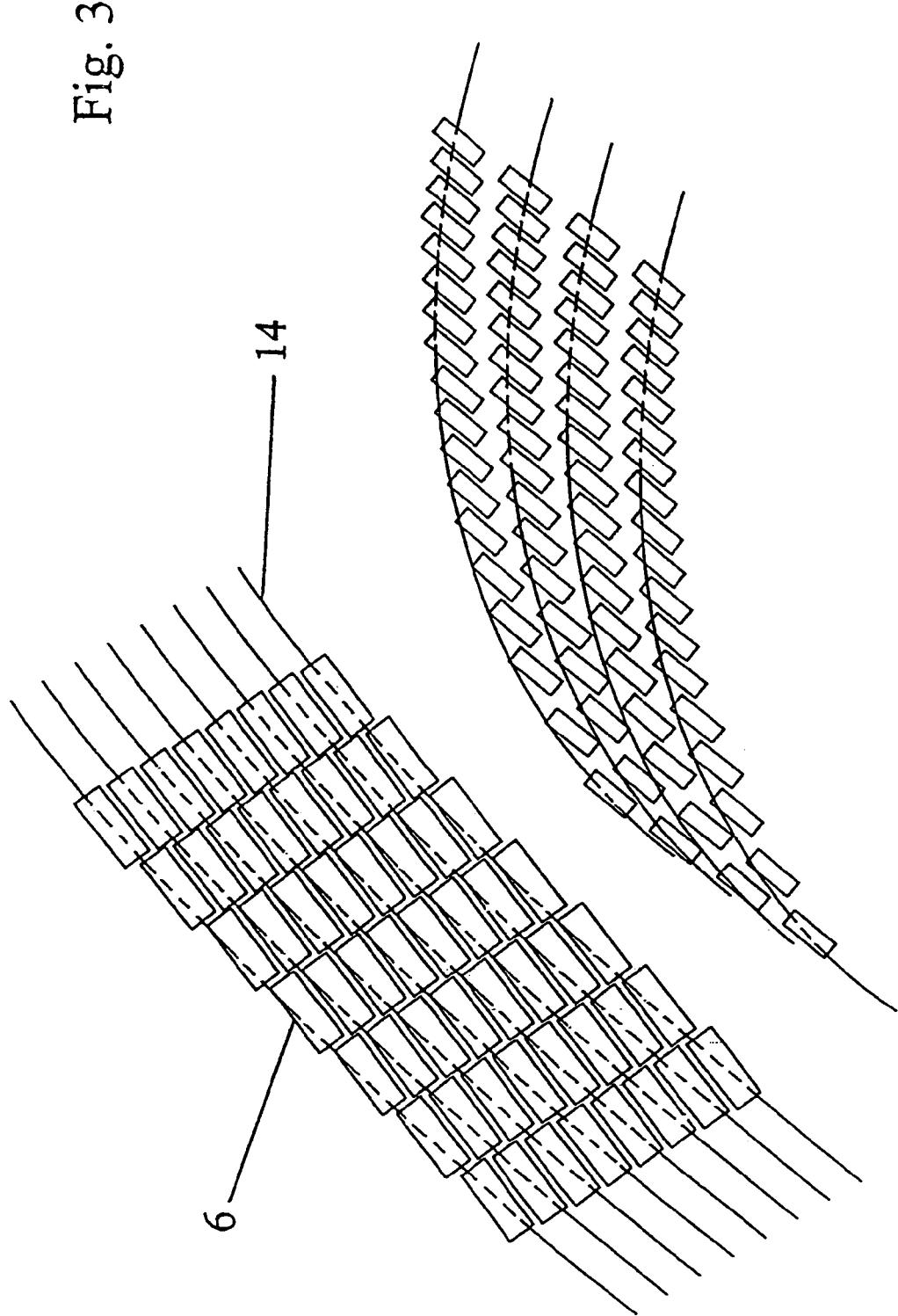

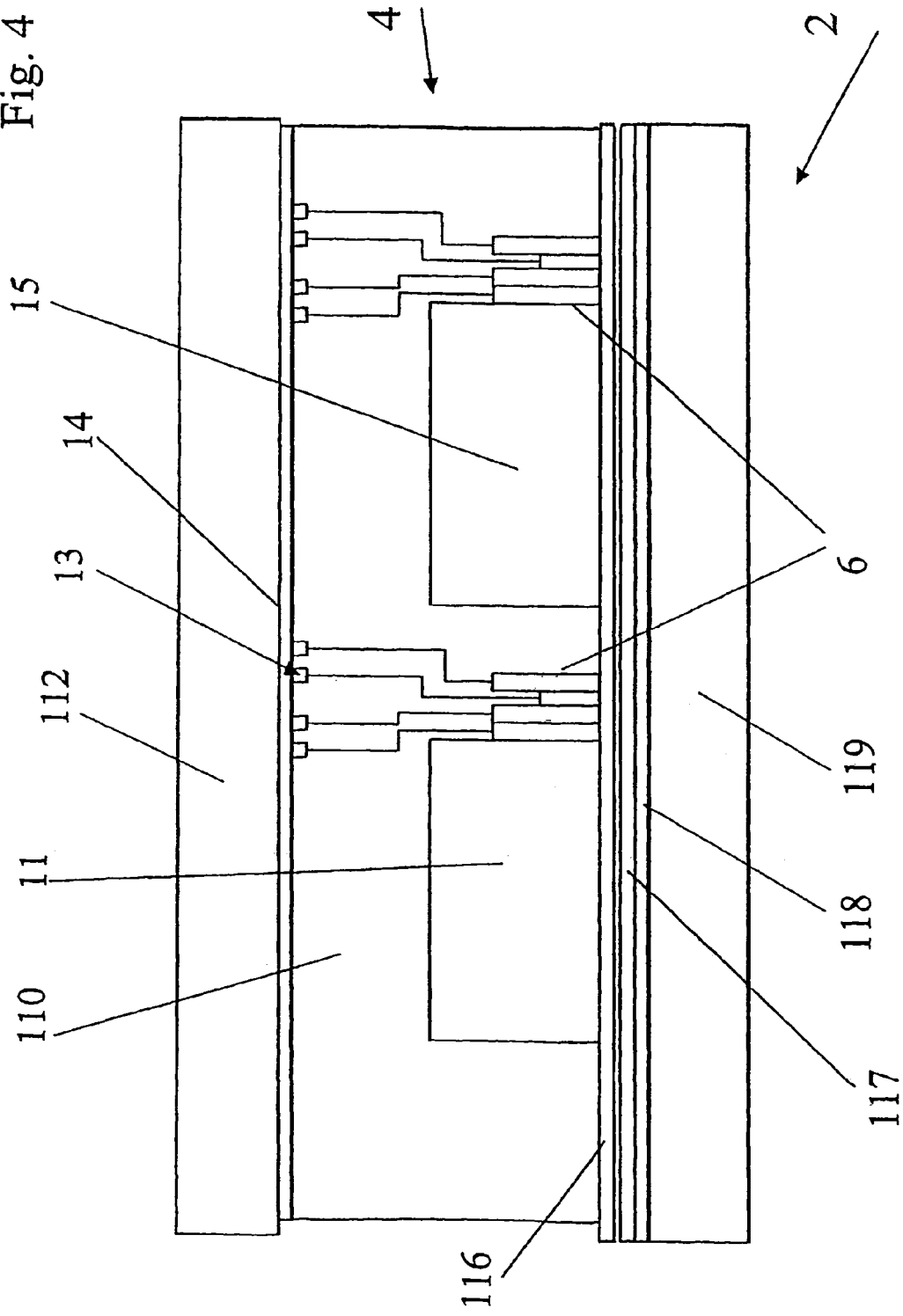

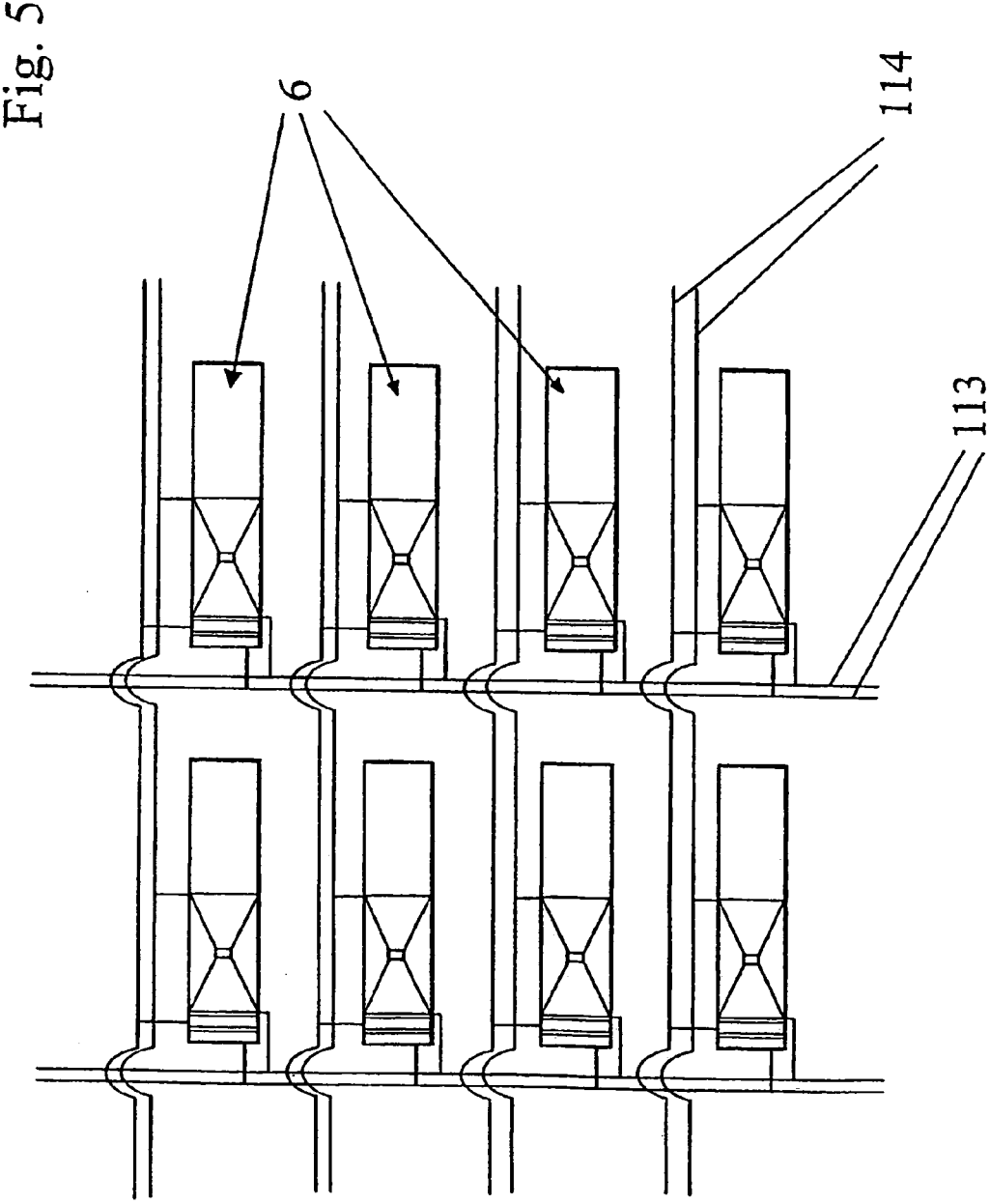

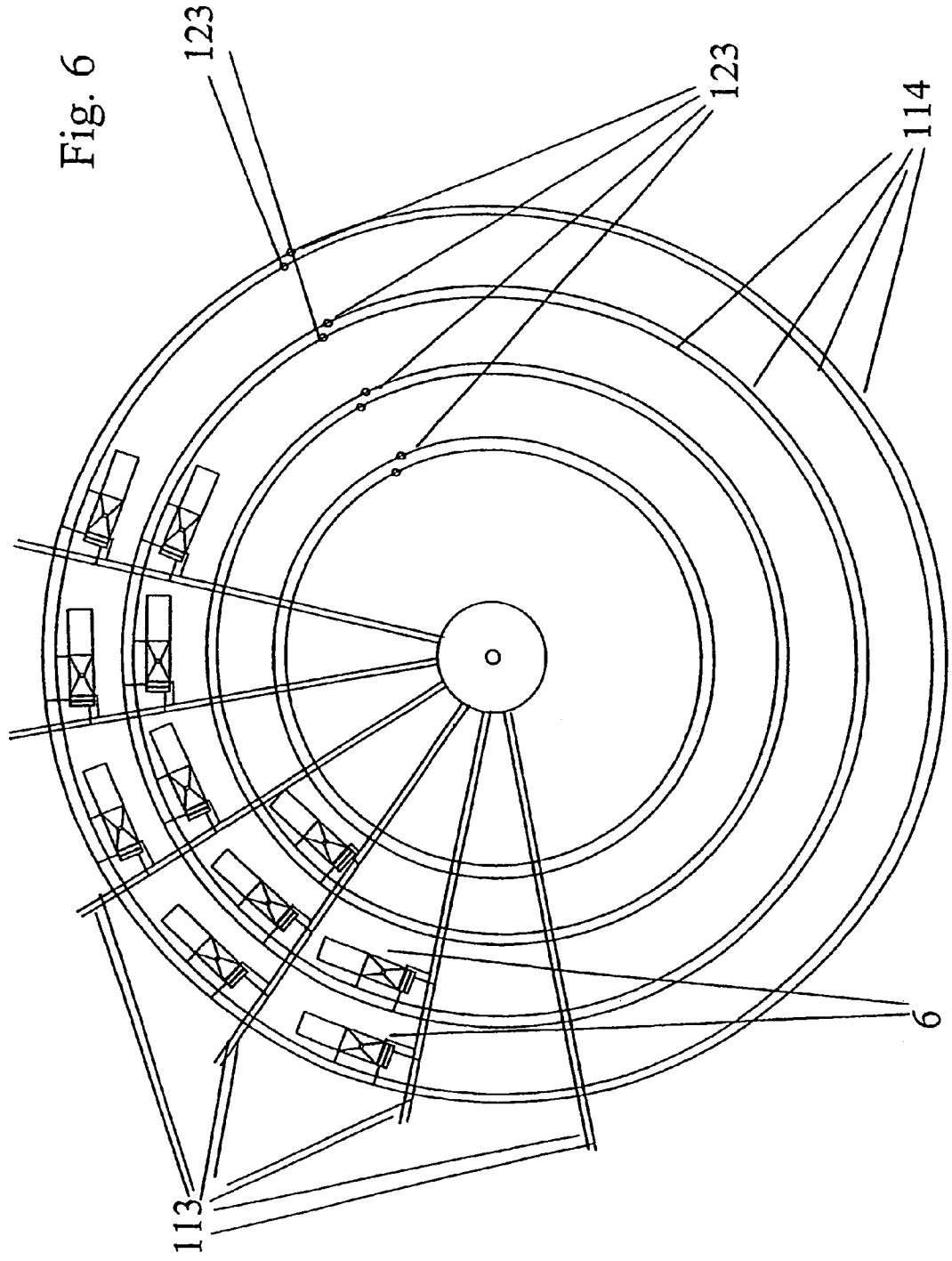

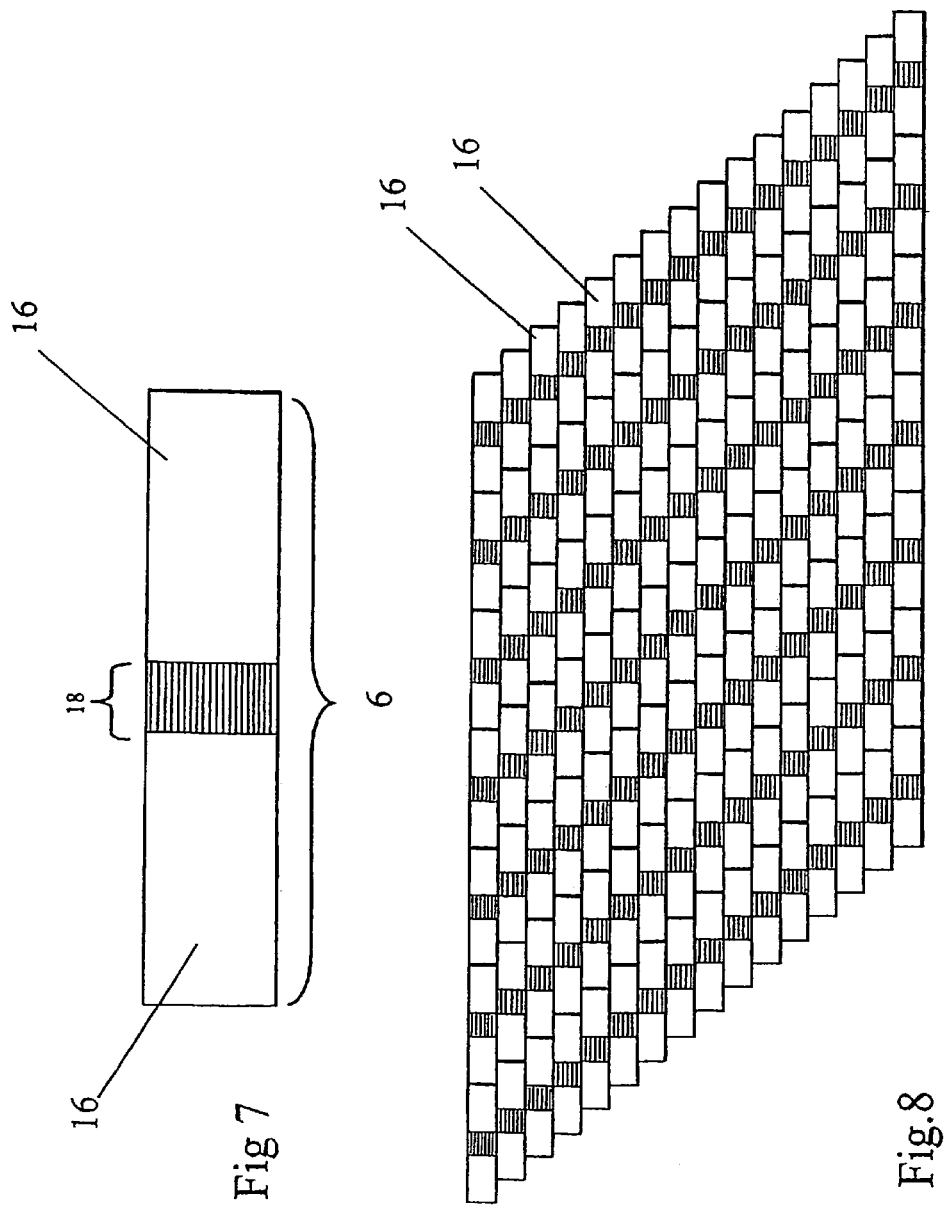

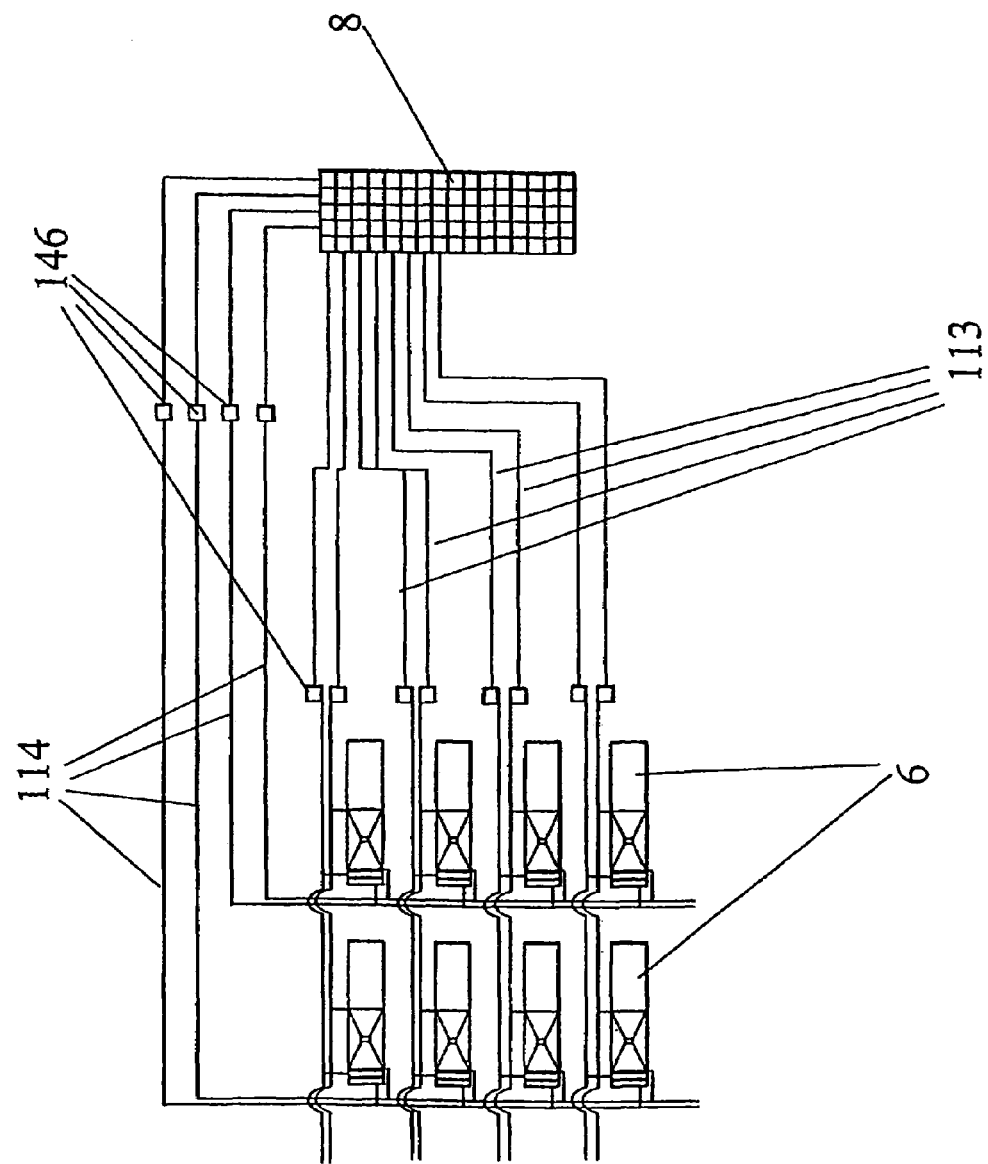

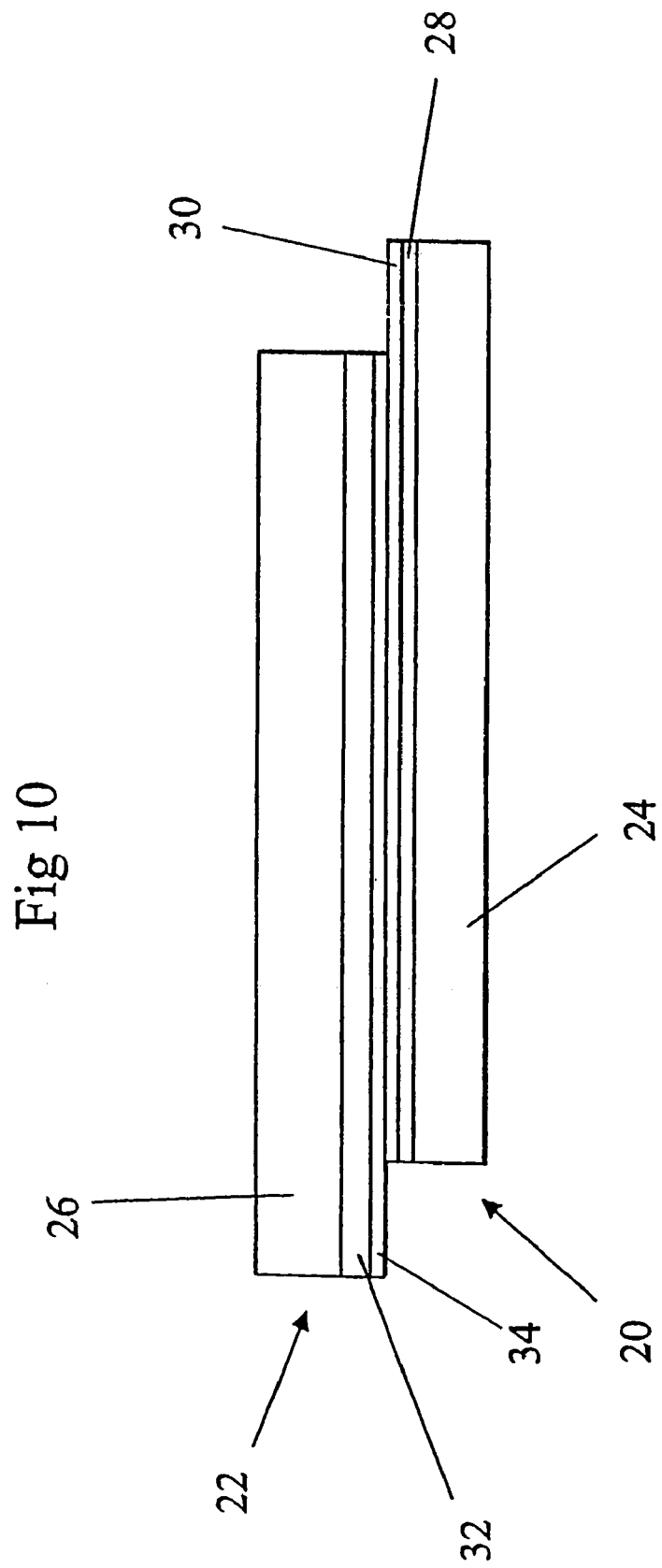

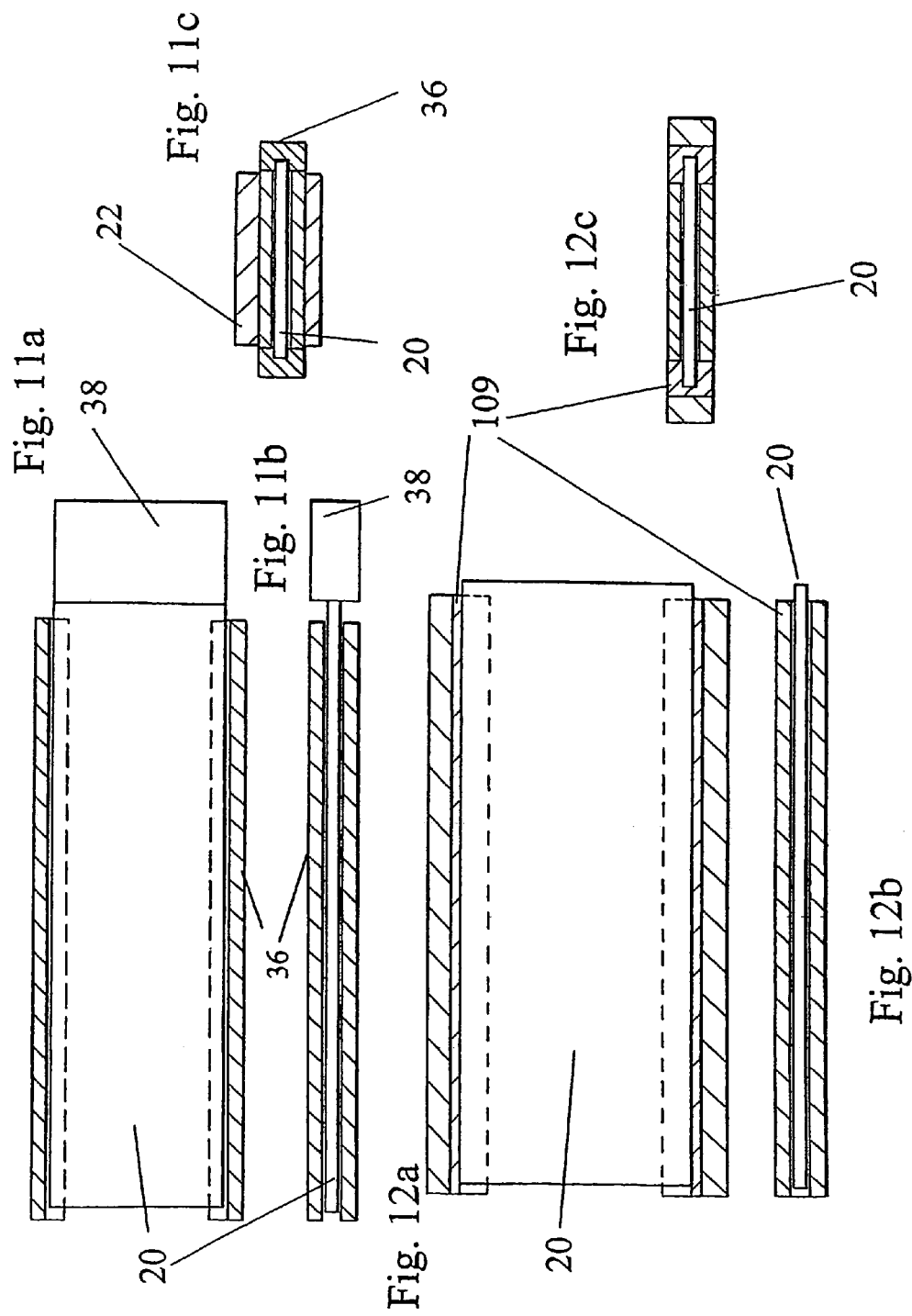

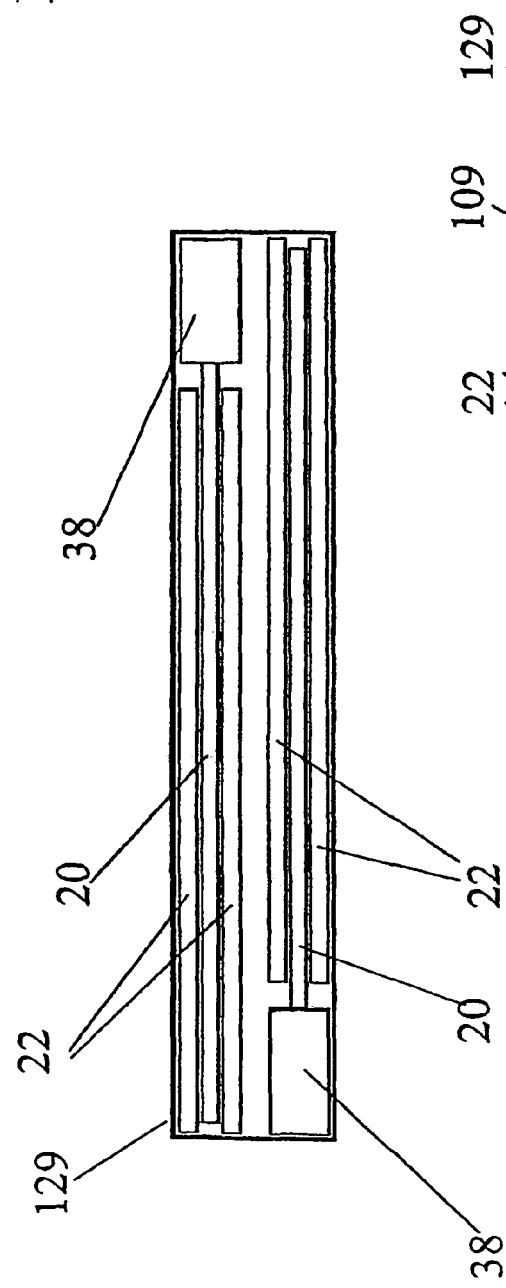
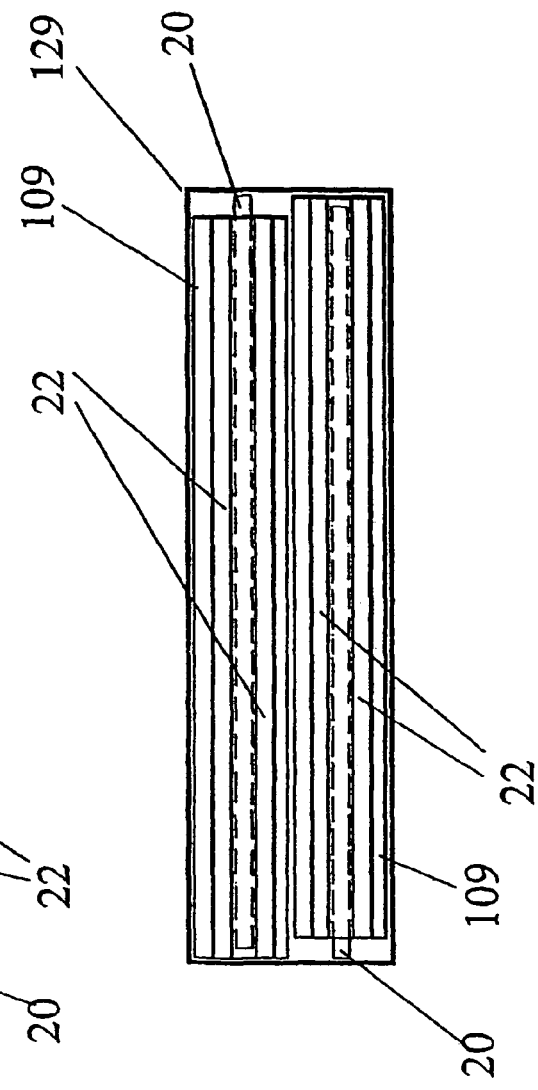

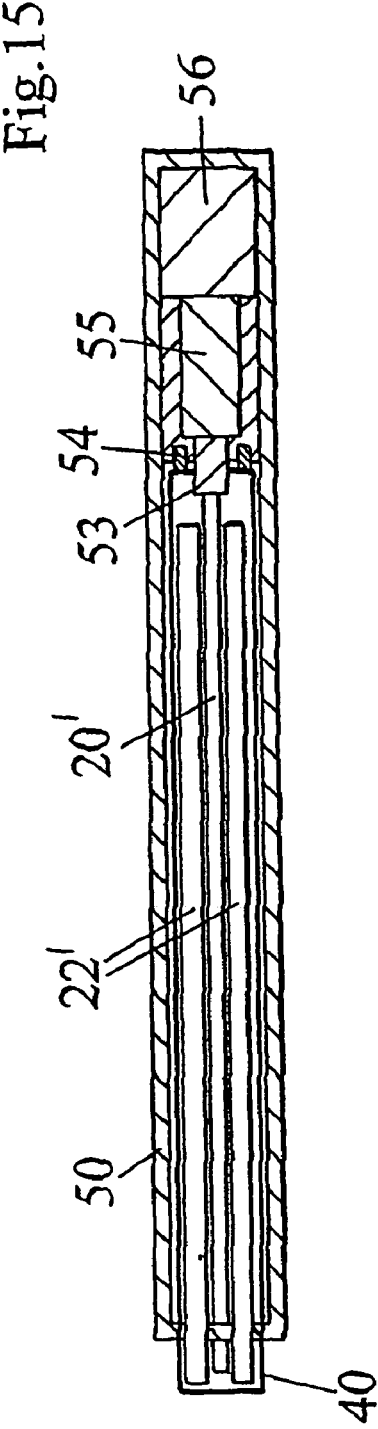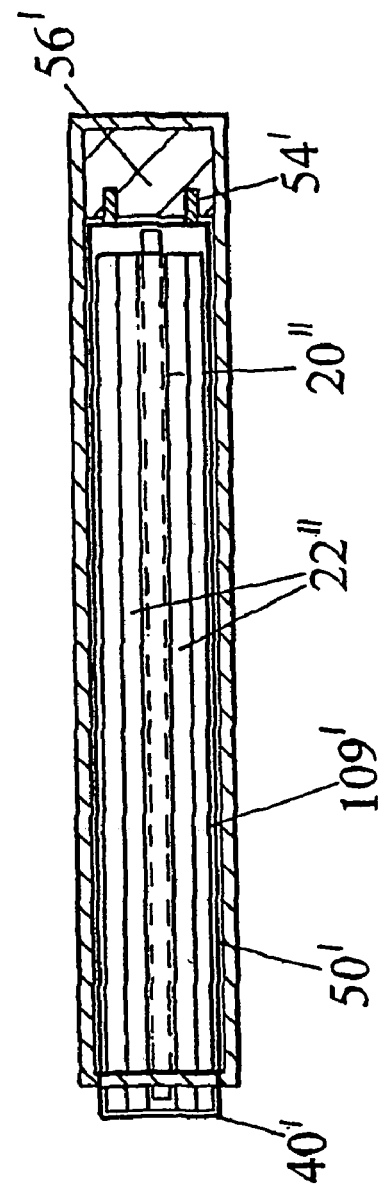

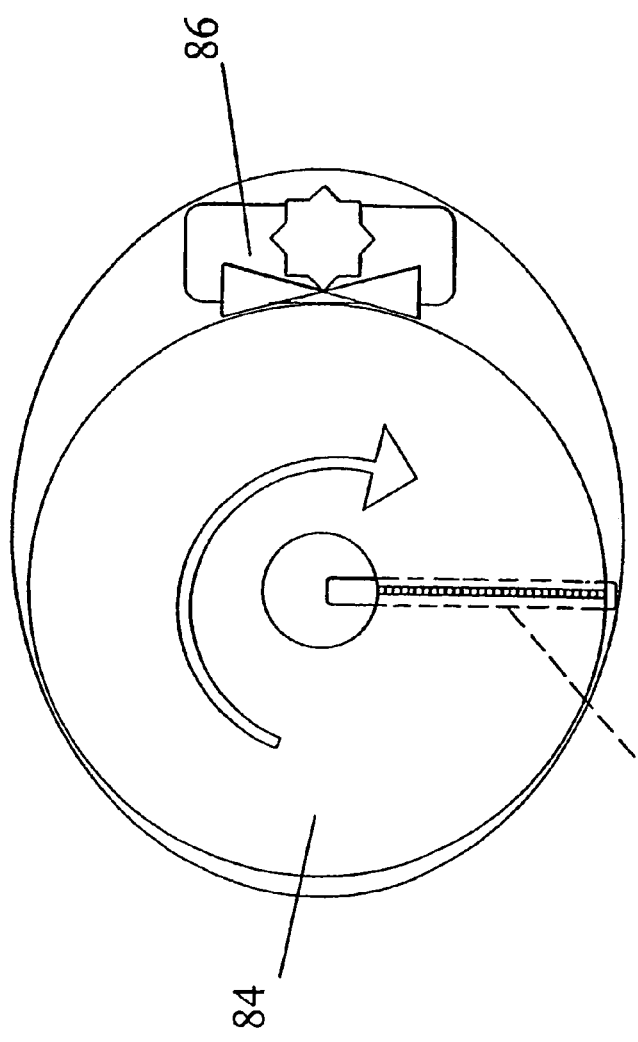
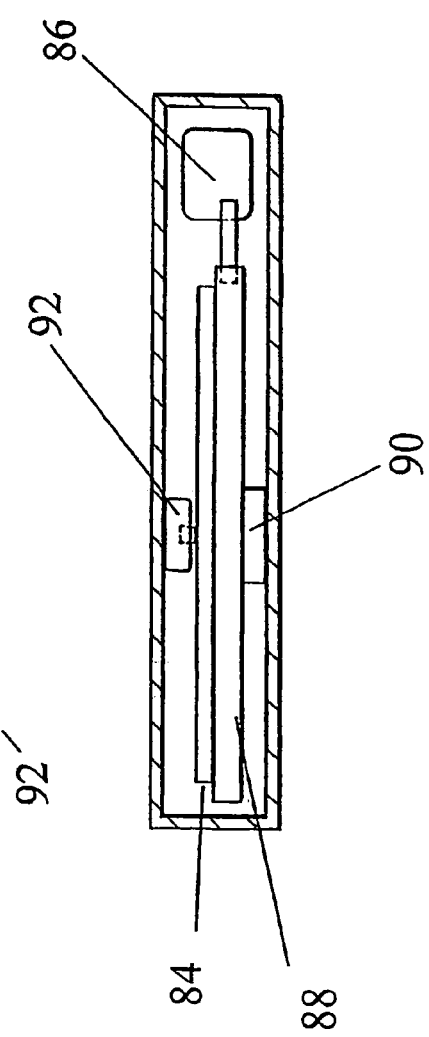
Fig. 17a
Fig. 17b

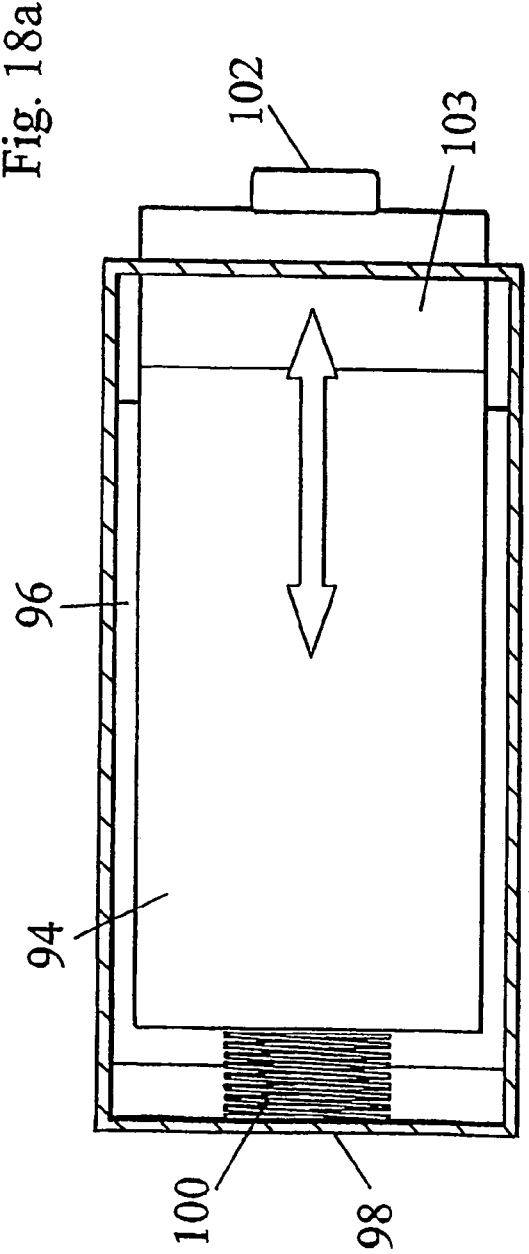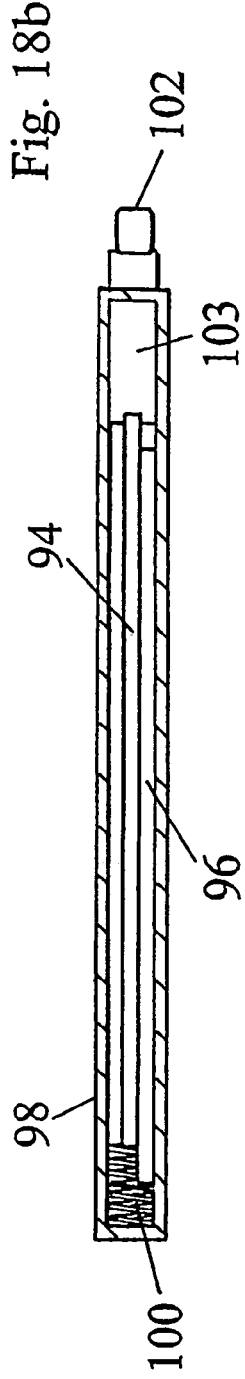

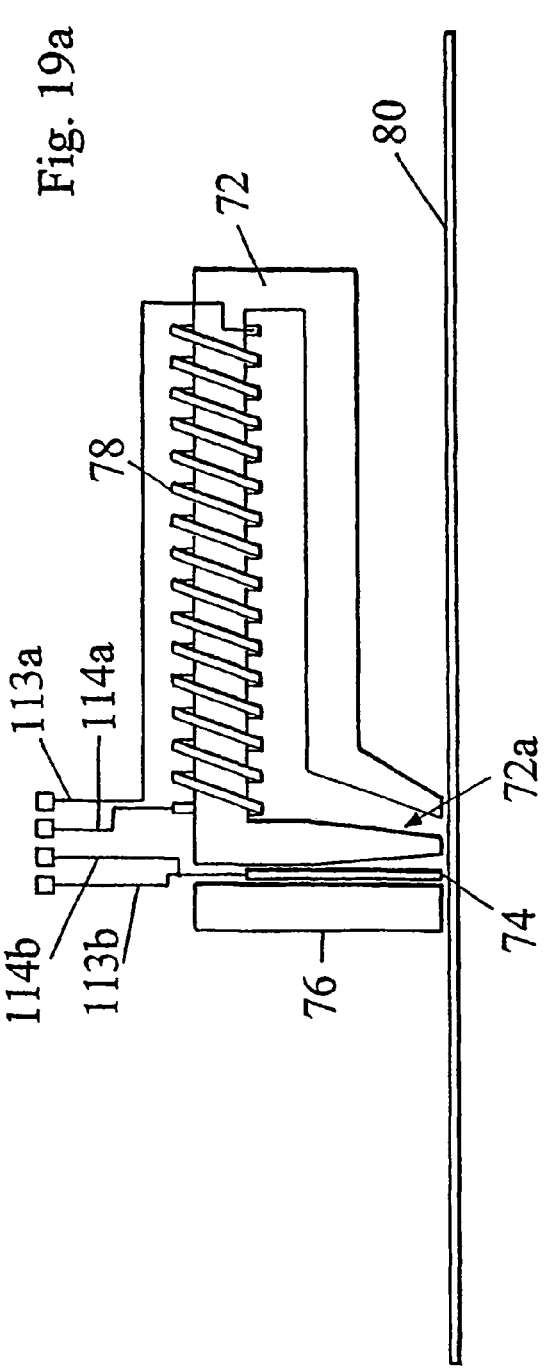
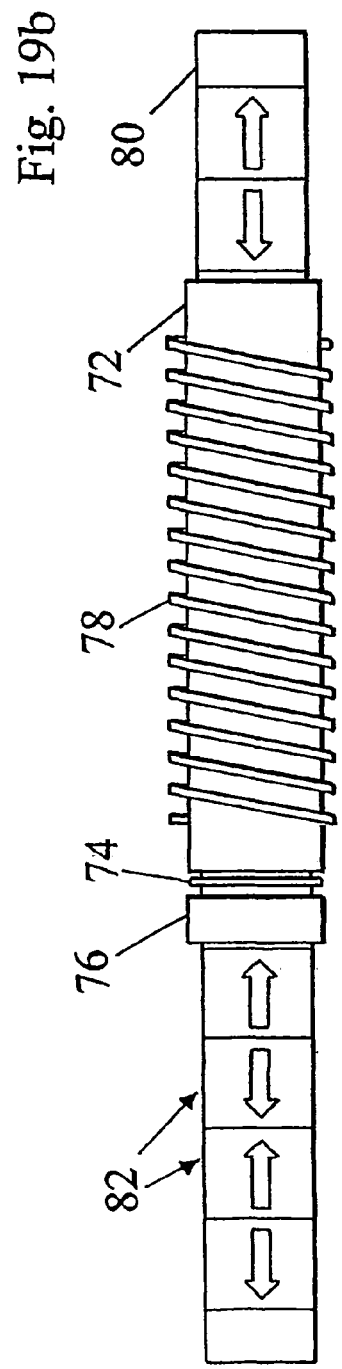

INFORMATION STORAGE SYSTEMS

This application claims benefit of Provisional Application No. 60/420,775 filed Oct. 24, 2002; the disclosure of which is incorporated herein by reference.

FIELD OF THE INVENTION

The present invention relates to information storage apparatus and methods of operation. It relates in particular to systems in which digital information is read from and written to information storage media. The invention is particularly directed to the storage of digital information on hard-drives, such as computer hard-drives, although the invention may extend to other types of fixed drive as well as to removable information storage media (such as floppy disks). The information storage media may be of read-only or read/write types and information may be stored or retrieved from the media by magnetic means, magneto-resistive means, optical means (such as in compact disk and DVD drives) as well as by any other suitable process.

BACKGROUND

A conventional hard-disk drive typically comprises a rotatable disk on which digital information can be stored, say by means of magnetic or optical recording techniques, such that information can be read, written and erased as desired. A typical magnetic hard-disk comprises a rigid platter made from a metal or ceramic and on which a magnetic coating is provided so that information can be stored of the disk by altering the magnetic properties of the coating.

The available storage area of the disk is organised physically into a number of concentric tracks between a central portion of the disk and an outer portion of the disk. The available storage area of each track is also subdivided into a number of sectors of a fixed number of bytes and which are generally wedge or pie-shaped regions. By organising the available storage area of the disk into concentric tracks and sectors, information can be written to specific areas of the disk and stored information can be located and retrieved.

In order to read or write data to a particular location on the disk, the disk-drive typically includes a read and a write head. Traditionally induction read/write heads comprising a coil of conductive material wound over a magnetic core were used with magnetic media. Information could be written on the disk by passing an electric current through the coil to generate a magnetic field which in turn alters the magnetic properties of an area of the disk. Information could be read from the disk by passing the head over the disk such that the magnetic material of an area of the disk causes an electric current to be induced in the coil that forms the read/write head.

Following on from that magneto-resistive and particularly Giant Magneto-Resistive (GMR) heads have been employed. These are micro structures which react with a detectable change in electrical resistance to magnetic polarity or spin resonance of a region of the magnetic storage medium. They are preferable to the induction heads described above since they have a greater sensitivity to magnetic flux changes therefore allowing greater spatial resolution allowing more densely packed information storage.

A more recently proposed alternative is a Hall effect detector which is described in U.S. Pat. No. 6,353,317.

The read/write head is typically attached to one end of a movable arm. The other end of the arm is supported on a pivot or head gimbal assembly (HGA) and is connected to some form of drive means so that the arm can be selectively rotated. As the arm rotates, the read/write head moves over the surface of the disk in a shallow arc from a central region of the disk to an outer region of the disk and can thus be selectively located over any of the tracks of the disk. The drive means must be able to move the arm at high speed as information is read or written and typically comprises some form of "voice-coil" mechanism, similar to a typical drive mechanism of a loud-speaker.

In use, the disk is rotated at high speed, usually at several thousand revolutions per minute (r.p.m.), and the read/write head effectively "flies" on a cushion of air generated by the spinning disk. The read/write head is thus maintained in very close proximity to the surface of the disk without actually touching it. Indeed significant damage can be caused to the surface of the platter if the head accidentally touches it during operation. This is known as a head crash and is most likely to occur when the drive is subject to sudden physical shock. This is a potential fragility of conventional hard disk drives.

Information is either written to or read from a disk as a result of instructions generated by a computer program as the program is processed. For example, a program may generate a request for information which is then sent, typically, to a disk controller and the physical position of the data is identified using a File Access Table (FAT), the New Technology File System (NTFS), a Virtual Table Of Contents (VTOC) or other well known means. The signal requires processing and amplifying, with a number of coding protocols being used to obtain the optimum spacing and signal strength. The disk controller then causes the arm on which the read/write head is mounted to be rotated so that the head overlies the appropriate track on the disk which contains the sector in which the desired data is stored. The data cannot be read however until the correct portion of the track is brought into alignment with the read head by the spinning disk. It is therefore necessary for the disk to spin at high speed to enable the desired circumferential portion of a track on the disk to be accessed at relatively high speed, i.e. to minimise the 'arrival time' of the data which will on average be half the time it takes for the disk to complete one revolution.

It is well known to increase the available storage capacity of a hard drive by providing a number of disks which are mounted to and rotatable about a single central shaft. The storage capacity of the drive can also be further increased (effectively doubled) by storing information on both faces of a single disk, i.e. by providing a magnetic coating and a movable read/write head on each side of a disk. For example early mainframe drives had between one and eight disks and therefore between two and sixteen surfaces and the protocols used reflected this limit. Information stored on other types of information storage media, such as on removable floppy disks and optical information stored on removable or fixed optical disks (compact disks, DVDs and so on) is generally accessed in a similar manner. An optical disk, for example, allows information to be read (or written) by optical means, such as by a laser arrangement, however the general principles of organising information into a spiral track or a number of concentric tracks on a spinning disk and providing means to selectively position a read/write head over a desired track portion are usually followed.

As well as the above described types of information storage system, proposals have also been made to construct disk-drives that do not employ a movable arm to position a read/write head over a particular track on a disk. Instead, the disk drive is provided with a head assembly that includes one read/write head per track of an information storage disk. The head assembly generally comprises a disk-shaped element with a number of read/write heads deposited on one surface of the disk-shaped element. The heads themselves comprise generally needle-shaped elements which extend from the surface of the head assembly and which, in use, make contact with the surface of a media disk. This form of disk-drive therefore does not require a movable arm since a read/write head can be positioned over each of the available information storage tracks at all times. In this way, the inbuilt latency of more conventional disk-drives caused by the activation and movement of a head/arm assembly is removed thus enabling improved information access speeds.

OBJECT OF THE INVENTION

The above known types of information storage drive however suffer from a number of limitations and drawbacks. The present invention therefore aims to improve on such known devices and in particular to provide systems of information storage and retrieval that provide improved performance and/or greater flexibility of use. The invention also aims to provide improved methods of construction of information storage systems.

SUMMARY OF THE INVENTION

From a first aspect the present invention provides an information storage apparatus comprising:
  a storage medium including a plurality of information tracks; and
  a head assembly having:
  a substantially planar surface; and
  a plurality of read/write heads positioned in registry with said information tracks;
wherein the read/write heads are arranged substantially in the plane of said planar surface and wherein said information storage medium and said head assembly are arranged in mutually sliding abutment such that said read/write heads are substantially in sliding contact with the outer surface of the information storage medium in use.

Thus it will be seen by those skilled in the art that in accordance with the present invention it is possible to construct a read/write head assembly which has a generally flat surface capable of reading and/or writing information to an information storage medium such as a magnetic disk and which can be positioned in use so that the flat "read/write surface" of the head assembly abuts against the outer surface of the storage medium.

Unlike conventional hard disk systems in which a single read/write head is mounted on a movable arm, the present invention has the advantage that a plurality, preferably a large array, of read/write heads is provided in registry with the tracks on the information storage medium which increases the speed with which information may be stored or retrieved. In particular, the provision of an array of generally fixed heads allows data to be written to or read from all of the available tracks of a disk enabling the latency associated with track seeking to be eliminated. Without the use of a movable arm and its associated drive mechanism, information storage systems can be produced that have a simple, more reliable and more energy efficient construction when compared to many conventional drives.

Furthermore however, the present invention also provides a number of advantages over known multiple head arrangements. It will be appreciated that by arranging the read/write heads to be in contact with the surface of the information storage medium such as a magnetic hard disk platter, the apparatus is made significantly more robust than in known arrangements since it is no longer necessary to guard against head crash. The storage medium and read/write heads may be maintained in contact simply by being a close tolerance fit. Preferably however resilient biasing means are provided for biasing the two surfaces together. Preferably the biasing means is arranged to apply a substantially constant relative pressure to the storage medium and read/write heads. This enables a constant kinetic friction to be maintained.

Preferably at least one read/write head is provided for all of the tracks that are available for information storage on the storage medium. Thus, in a simple arrangement, the head assembly may comprise a number of read/write heads that are arranged to overlie a corresponding number of tracks on an information storage medium with the heads flush with a planar surface of the head assembly which in turn can be placed into contact with a planar surface of the information storage medium.

In one preferred arrangement in which the information storage medium comprises a disk and the tracks comprise concentric circles, the read/write heads may be mounted so that they extend in a line from the innermost track on the disk to the outermost track on the disk with each read/write head positioned to overlie a particular track. A line of read/write heads can therefore be provided that spans across the entire usable storage area of a information storage disk. Of course a plurality of such lines circumferentially spaced may be provided.

As stated above, in a simple form a read/write head arrangement of the present invention may comprise a generally linear array of read/write heads which extends across the tracks of an information storage medium with a read/write head generally overlying each track. It will therefore be apparent that the number of tracks that can be provided for information storage is generally only limited by the physical dimensions of the read/write heads. Thus the minimum track width that can be used is generally only limited by the ability to manufacture read/write heads that generally correspond to the width of that track and by the ability to read/write information to a track of that width.

At current levels of technology, read/write heads can be manufactured at a pitch in the region of between 17 and 1.7 microns. In other words the aggregate width of the magnetic material, coil material and two signal tracks per head would be between 17 and 1.7 microns. Thus it may be possible to manufacture an array of read/write heads which comprises over 10,000 individual read/write heads per inch but which is sized to operate, for example, with a generally conventionally sized information storage disk and capable of reading and/or writing information to a corresponding number of tracks on the disk.

The present invention also provides further means to increase the read/write head density (and thus the track density) of an information storage device.

From a second aspect, the present invention provides an information storage apparatus comprising a read/write head assembly comprising a plurality of read/write heads, wherein the read/write heads are arranged in an arc formation such that in use the read/write heads are positioned along an arcuate line extending across the tracks of an information storage disk with each read/write head located generally above a corresponding track.

Unlike in one of the previously described arrangements of radially extending read/write heads, the above arrangement of read/write heads in an arcuate line can enable a greater density of read/write heads to be provided. The arcuate head arrangement suitably orientated with respect to the tracks of an information storage disk allows adjacent heads to be radially offset from each other which can enable the limitation caused by the physical dimensions of the read/write heads to be overcome. Thus the minimum track width is not limited to the width of the read/write heads but instead can be of a lesser width if the read/write heads are provided in a staggered manner along an arcuate line.

In a simplified example, given for illustrative purposes only, an information storage disk may have a usable information storage area that begins at 20 mm from the centre of the information storage disk and ends at 60 mm from the centre of the disk. If the read/write heads have a width of 25 microns (0.025 mm) then a linear array of adjacent read/write heads that extends along a radial line over the usable storage area of the disk can include 2000 read/write heads thus the usable storage area of the disk can be arranged into 2000 concentric tracks with one read/write head per track. By using an arcuate array of read/write heads with adjacent heads being offset with respect to each other, the number of heads that can be provided over the usable area of information storage can be increased to many hundreds with a corresponding increase in the number of tracks into which the useable information storage area can be arranged.

Advantageously therefore, from a further aspect, the present invention provides an information storage apparatus comprising a plurality of read/write heads, wherein the read/write heads are arranged such that in use each track of an information storage disk can be accessed by more than one read/write head.

In a preferred form, the read/write heads are provided in a number of sets wherein each set of read/write heads extends across all of the available tracks of the information storage disk. Thus in one simple arrangement, a first set of read/write heads may comprise a generally linear arrangement of read/write heads that extends radially across all tracks of the information storage disk or laterally across a rectangular information storage member. If it is desired to provide many read/write heads per track, then second and subsequent sets of read/write heads are provided in a similar arrangement to the first set of head but spaced circumferentially or longitudinally therefrom.

In a particularly preferred arrangement of the multiple head per track aspect of the invention, each set of read/write heads is provided along an arcuate line to enable an increased head density (and corresponding track density) as described above. In this arrangement, it is preferred that each set of read/write heads follows a generally spiral curve so that when a number of sets of read/write heads are provided adjacent to each other the spacing between multiple heads of each track increases from the innermost track to the outmost track whilst at the same time enabling the multiple read/write heads of each track to be staggered so that the density of read/write heads can be maximised.

As can be seen the invention provides a number of advantageous head arrangements which can provide improvements in the mechanical performance of information storage disk as well as improvements in the performance of information storage and retrieval.

The information storage apparatus in accordance with the foregoing aspects of the invention preferably comprises refresh means for ensuring that an optimal signal strength is maintained. Preferably the refresh means comprises means for monitoring the signal strength available from the storage medium, said means being arranged to rewrite the received signal if the signal strength available falls below a predetermined threshold. The refresh means preferably comprises suitable software—e.g. a suitably modified driver.

The inventor has realised that as well as the latency in activating and moving the arm mechanism to position the read/write head over a desired track, a further 'spin' latency occurs because, whilst the head may be ready to read/write information, the sector that it is wished to access may not be located in a position beneath the read/write head. When the read/write head is first moved over the desired track, the sector that it is wished to access may have any rotational position, i.e. it may be located at any point circumferentially on a track. There is therefore a time delay as the disk rotates into a position where the beginning of the sector to be accessed is located beneath the read/write head.

Conventionally, efforts have been made to increase the speed of rotation of information storage disks in order to reduce the time delay in waiting for a particular part of the disk to rotate into a position in which it can be accessed. Whilst this approach can reduce this latency there are difficulties in producing such high speed drives. For example it has been found that very high speeds can be achieved by employing a disk of a smaller diameter however such disks will have a reduced area and reduced storage capacity.

Additionally, the higher the speed of rotation of a disk the more energy that is required to rotate it and the more heat caused by air friction that is generated by the drive and that must be dissipated. Furthermore the inherent vibrational increase with greater rotational speeds causes potential problems with misalignment etc. Consequently, there is a limit to the degree to which this type of latency can be reduced through increasing disk rotation speeds.

In accordance with the present invention however, if a large number of read/write heads is utilised, a relatively low spin rate may be used for an information storage disk without sacrificing data access times. As a result the previously perceived disadvantages of head contact—the generation of heat and rapid wear—may be substantially obviated. In preferred embodiments of the invention an information storage disk is made to rotate relative to the read/write heads at a rotational speed of less than 600 revolutions per minute, preferably less than 60 rpm and even as low as 6 rpm or slower. It will be immediately appreciated that this goes completely against the perception in the art that disk revolutionary speeds should be increased as high as possible. As an illustration, the revolutionary speed of currently known hard disk dives is of the order of several thousand revolutions per minute. Direct contact between the read/write heads and the surface of the information storage medium could not realistically be contemplated at such speeds since even with just a single read/write head, the platter would be subject to unduly rapid wear and the heat generated would cause thermal misregistration between the head and the tracks of the platter.

Indeed it will be appreciated by those skilled in the art this is novel and beneficial in its own right, even if the read/write heads are not in contact with the platter and thus when viewed from a further aspect, the present invention provides an information storage apparatus comprising an information storage disk and at least one read/write head arranged to read information from or write information to said disk, wherein said disk is arranged in use to revolve relative to said read/write head at a speed of less than 600 revolutions per minute.

Thus it will be seen that in accordance with this aspect of the invention, a much lower speed is used which means that even with contact between the read/write head(s) and the information storage disk, there will be significantly less heat generated and, where contact is not intended, reduced chance of head crash. Furthermore in accordance with preferred embodiments of the invention, a large number of heads are provided in a planar surface, meaning that each head is "local" and so any expansion effects are therefore relatively minimal.

Preferably a large number of read/write heads is provided as in accordance with the first aspect of the invention. Preferably these are provided on a monolithic layer, e.g. by being etched onto a common silicon disk. The advantages of such arrangements are set out above.

The interface between the read/write heads and the information storage medium can be take any suitable form and be maintained by any suitable means and a number of suitable arrangements will be apparent.

Preferably, the read/write heads are generally fixed in position and the information storage medium overlies the read/write heads with means for lubricating provided therebetween. Preferably the lubricating means comprises a self-lubricating layer on at least one and preferably both of the storage medium and head array. Preferably the self-lubricating layer comprises an artificial diamond coating such as tetrahedral amorphous carbon (taC) or ultrananocrystalline forms. These are fundamentally self-lubricating since they essentially combine the characteristics of graphite and diamond, with their coefficient of friction in dry nitrogen being of the order of 0.001. By comparison, the corresponding coefficient of friction for polytetrafluoroethyleneis approximately 0.04. This means that for a sliding member having a weight of approximately 10 to 25 grams, the force required to overcome static friction is of the order to 10-25 milligrams.

Kinetic friction is generally less than static friction and so the kinetic friction is expected to be of the order of between 5 and 15 milligrams of force. This is the force that is therefore required to continue rotation, oscillation etc. It has also been appreciated that in most preferred embodiments there is continuing regular relative movement between the storage medium and detector surfaces and thus 'stiction' is minimised.

Suitable drive means may be provided to rotate the information storage disk above the read/write heads. Conventional drive means such as electric motors may be suitable for this purpose although it is envisaged that other drive systems might be employed such as a 'clockwork' system in which energy is stored in a spring by winding it.

In one embodiment the central portion of the information storage disk forms part of an induction motor to provide a non-contact drive to rotate the disk using known induction technologies. Such an arrangement may again simplify construction and reduce the number of moving parts in the device which may improve reliability.

In each of the above described arrangements, a plurality of information storage disk may be provided within a information storage disk in a similar manner to conventional stacked disk drives.

Mounting of Heads

In each of the above described aspects the plurality of read/write heads may be arranged in position by any suitable means. Preferably, all of the read/write heads provided are mounted on a single member, say a generally planar element that can be accurately located above the tracks of an information storage element, such as a disk or rectangular member, in use. The read/write heads may however be mounted on a number of distinct elements for example if multiple read/write heads per track are provided and the heads are arranged in a number of sets as described above then each set may be mounted on its own element.

If the heads are fabricated so that they are proud of a supporting substrate a filler layer may be provided between them to ensure that they are substantially flush.

In a particularly preferred arrangement, the means for mounting the read/write heads comprises a planar element generally sized and shaped to correspond to the size and shape of the information storage medium it is used with (or at least to the useable storage area of the information storage medium). Such an arrangement enables increased flexibility in the positioning of the read/write heads since a read/write heads can be positioned to overlie any area of the available storage area of the information storage medium and can be adjusted laterally to provide alignment of heads to tracks.

The head assembly may extend across a limited portion of the storage area on the information storage medium, but preferably they are substantially coextensive. In particularly preferred embodiments the information storage medium and the head assembly are fabricated from similar substrates in a similar way.

Preferably the storage medium and or head assembly comprise(s) a low friction coating to minimise frictional heating. In preferred embodiments a tetrahedrally amorphous or diamond-like coating is provided on one or preferably both of the surfaces in contact.

The amount of power required to drive each read head is, in accordance with preferred embodiments, also adapted to ensure any heating effects are minimised. This is likely only to be an issue with massively parallel write cycles.

Having the read/write heads substantially in the plane of the surface on which they are provided is particularly beneficial since it enables fabrication of a large number of such heads from a suitable base substrate material such as silicon wafer using well known etching techniques. This allows large numbers of heads to be used at relatively low cost. In particular it enables a high surface area density of heads to be formed. Furthermore it ensures that the information storage medium and the head assembly will in use be at substantially the same temperature. This is of particular advantage where, as is preferred, the information storage medium and the head assembly are substantially the same size and shape and of materials having similar thermal expansion coefficients since they will react similarly to thermal factors.

The large scale, integrated circuit style of fabrication achievable and employed in accordance with preferred embodiments of the invention opens up further advantageous possibilities. In general terms the head assembly is preferably fabricated with features to maximise yield and redundancy both immediately and during the lifetime of the product. In preferred embodiments the heads are arranged topologically in a rectangular array. It will be appreciated by those skilled in the art that such a rectangular array of heads can be addressed by reading signals from or writing signals to just one end of each row and column. Preferably however, the head array comprises connections to both ends of the rows and columns. This simple redundancy allows continued operation even if a failure occurs in any of the row/column connections.

The inventor has also realised that integrated circuit fabrication technique may be further exploited to provide components to carry out initial processing of information read from the storage medium. In preferred embodiments therefore the head assembly comprises pre-processing and/or pre-amplification circuitry for pre-processing and/or pre-amplifying data read by said heads prior to being output from the head assembly.

In some embodiments envisaged lasers may be employed at the edge of an array of heads to detect and process the signals from the heads.

The head array is preferably arranged to be manufactured in a plurality of steps with more complex processing being carried out after more simple processing. This maximises the effective yield of the fabrication process since the substrates may be tested at each stage. This ensures that only those substrates which have been successfully fabricated in the simpler stages are subjected to the more complex and therefore more expensive fabrication stages. This is also enhanced by arranging, in accordance with preferred embodiments, that different components are located in distinct areas on the substrate, e.g. heads, signal connections and pre-amplifier components such as transistors etc.

In one example fabrication process comprises the following steps: polish substrate; coat with dielectric (if used); lay down signal tracks using metal thin film/sputtering or similar; build the control circuits, these are thin film transistors (TFT's) in one of the main embodiments; lay down detector array of read/write heads, with planar coils and either giant magneto-resistive (GMR) or Hall effect read heads or some other detector technology; and coat with diamond. This process is significantly similar to the construction of liquid crystal flat screens with detectors instead of pixels. Indeed this is a preferred feature of the invention.

Substrate

In preferred embodiments the information storage medium and/or the head assembly comprise 'zero' expansion materials such as glass ceramics as used for Extreme Ultra Violet Lithography. These are fabricated by Schott Lithotec and Schott Glas, developed on the basis of 'Zerodur' ultra low expansion glass ceramics. Ultra Low Expansion (ULE) titanium silicate glass ceramic from Corning Inc may also be used. These have been designed to have less than 1 nm per 100 mm expansion per degree Kelvin temperature rise. To give an example, in currently preferred embodiments the width of the data tracks is of the order of 1 to 2.5 microns. The total thermal movement of the storage medium surface in such an embodiment is therefore in the region of 0.001% relative to each track.

In addition to the above, generally mechanical improvements in information storage systems, the present invention may also provide considerable improvements in the performance of reading and/or writing data to information storage media. In particular, the invention may provide a substantial increase in the speed at which data can be stored or retrieved, or, viewed another way, the invention may provide a substantial increase in the volume of data that can be read/written in a given time.

The performance of a hard-disk can often be a limiting factor in the overall performance of a computer system. Central Processor Unit (CPU) usage is divided into four types, System, User, Wait I/O and Idle. The System CPU usage is that required by the operating system. The User CPU usage is that required by the applications, and is effectively the actual delivered workload of the CPU. The wait I/O CPU usage is the time spent by the CPU engaged by a particular task and waiting for data which it requires to continue the task, to be delivered. The idle CPU usage is the time when no activity is occurring. Therefore a high speed CPU may not be able to achieve its best performance if it has to read and write data on a relatively slow hard-drive even with the efficient use of paging and caching. A decrease in the hard-disk access time is therefore potentially of huge importance in the context of computers.

One of the problems with increasing the areal density of conventional hard disk drives has been that, with a one dimensional access path, the density to access time ratio grows greater. In accordance with the preferred embodiments of the present invention however, the areal density and access speed can be increased in parallel by correspondingly increasing the areal density of read heads. In other words, as the media surface becomes more dense, the heads can be made smaller, using similar basic fabrication technologies, with less linear space required for each flux change. Therefore potentially if the areal density is doubled, then the access time may be halved, with no increase in relative mechanical movement.

Another factor limiting the overall performance of known devices is file fragmentation. In accordance with preferred embodiments of the present invention however, the fragmentation of files is less of a limiting factor as each fragment or cluster may be addressed directly. Database access might be planned to take advantage of the proposed physical medium surface layout with access to fully de-normalised relational file structures or flat files access being potentially simpler, and more rapid, with either less, or more direct, indexing. The foregoing should be understood as within the limits of each particular file system, with index size becoming a performance issue in its own right if these become too large.

This is particularly relevant to historical, empirical, tabular and other regular data. Given a sufficient number of indices, it may be possible to do a considerable amount of local processing by simple topology, i.e. a relational calculus structure implicit in the physical layout of the data on a surface. This would provide for embodiments with little or no stored energy requirement for reference to a display screen.

This implicit relational calculus mapping would also provide for an embodiment which would be able to use Structured Query Language (SQL) primitives directly with no need for calculation. In essence a local hard drive server to a screen (and input device) client. Also since a network may be collapsed to a matrix, network analyses may also be performed in the same scale, physically and computationally. This would also apply to applications with massively parallel algorithmic designs, with memory structures which would potentially be addressable at each 'pass'.

Also in practice there is often no necessity to access the data more quickly than in 'human response' timescales, i.e. 150-800 milliseconds.

In one set of preferred embodiments the information storage medium comprises a substantially circular disk as is conventional. This can be advantageous for many reasons associated with its similarity conventional disk systems. For example many of the hardware and software components may be utilised either without modification or with little modification—giving clear cost benefits. Indeed many of the components of information storage systems in accordance with this invention may benefit from simplified versions of current drive components, heads, firmware drivers and algorithms and access paths.

However the inventor has realised that a continuously rotating disk is not essential if a plurality of heads is employed since the magnetic storage medium area may be adequately accessed by the heads by oscillating the storage medium with respect to the heads rather than rotating it.

Thus in a further set of preferred embodiments the information storage medium is arranged to be oscillated with respect to a plurality of read and/or write heads. This can have several advantages. For example it allows faster access to data since the 'spin-up' time for a rotating disk is avoided.

It will be appreciated that in accordance with the embodiments of the invention set out above, data may be accessed on a single 'pass' or oscillation. Any data may therefore be retrieved in one 'pass' if the position of the data is identified previously in the current data transaction processing, by analogy to the standard technique of head/track/sector.

This method of data retrieval is novel and inventive in its own right and thus when viewed from another aspect the invention provides a method of retrieving data from a non-volatile storage medium comprising passing an array of heads over said storage medium such that each head traverses only a minor portion of said medium in the direction of their relative movement, reading data from one or more of said heads and outputting the read data.

Preferably all of the required data is read in a single pass.

The inventor has further appreciated that this principle is novel and inventive in its own right, not necessarily just in the context of the first aspect of the invention. Thus when viewed from a further aspect the invention provides an information storage and retrieval apparatus comprising an information storage medium and an array of information read and/or write heads and comprises an information storage area the information storage medium and array of heads being arranged to be oscillated with respect to each other in use such that each region of the information storage area is aligned with at least one of said read/write heads during said oscillation.

Thus it will be seen that this aspect of the invention can provide information storage and retrieval systems analogous to conventional hard disk drives in that information may still be permanently stored on an e.g. magnetic medium and may be read/written to by passing a suitable read/write head over it or, more preferably, an array of heads. However it will be appreciated that this opens a vast range of design possibilities for hard disk type information storage systems without the physical limitations imposed by known rotating technology. Indeed in view of the separate read and write signal paths and processing provided in accordance with the preferred embodiments of the invention, simultaneous reading and writing from/to a given area is possible.

The advantageous features of this aspect of the invention may be realised with the storage medium and heads undergoing mutual rotary or otherwise curved oscillation. In more preferred embodiments however the storage medium and heads are arranged to oscillate linearly with respect to one another. In the former case it is convenient, although not essential, that the storage medium and head assembly are circular or part-circular; whereas in the latter case they are conveniently, but not essentially, non-circular.

Preferably the information storage area and preferably also the head array, is/are rectangular (including square). The data tracks would therefore most conveniently be straight and parallel to one another. However any convenient shape of storage area or tracks may be used depending upon the application. Of course with an array of heads, the area swept by each head will only be a minor portion of the length of the storage area in the direction of oscillation. The term 'tracks' is not therefore the most illuminating description since the information storage area may be more accurately considered as an array of storage sub-areas corresponding to the sweeps of each of the heads.

Preferably an array of coplanar read/write heads is provided as in the first aspect of the invention.

A number of mechanisms are envisaged for driving the information storage medium and array of heads relative to one another. For example, either or both components could be driven by a servo. In the preferred embodiments however a simple piezo-electric actuator is used. This is beneficial since it provides a particularly direct driving force to the component on which it acts which reduces any tendency for a skew force to be imparted. The use of piezo-electric motive force is made possible by the small amount of movement required in accordance with the preferred embodiments of the invention.

Where, as is preferred, linear oscillation is employed, the storage medium and heads are preferably mounted to one another by means of sliding side bearings.

In one set of preferred embodiments two oscillating information storage media or head arrays are arranged to oscillate in anti-phase. This is advantageous as it minimises overall vibration within a unit. This applies equally to rotary and linear oscillation and of course may be scaled up by providing pairs of contra-oscillating members.

It is even envisaged that in some embodiments no internal or external source of power will be required and that the required relative movement may be achieved simply by agitating the unit as a whole—e.g. tapping with a finger or compressing and releasing a spring inside the unit coupled to one of the relatively moving elements. Clearly this is more likely to be of use in applications where data is required relatively infrequently, such as historical data.

Although it is presently preferred that the information storage medium and head array are substantially planar, this is not essential. Embodiments of the invention are therefore envisaged in which the two surfaces thereof are non-planar. For example they may be partly or completely cylindrical or some other curved shape. All that is important is that a substantially constant spacing be maintained between the surfaces during their mutual oscillation. This spacing would be zero where, as is preferred, the two surfaces are in contact with one another. This of course opens up the design possibilities even further and particularly enables significantly more compact information storage.

Preferably the array of heads and information storage medium are resiliently biased towards one another. This has the advantage of ensuring a more constant signal strength and general stability. It also reduces the risk of loss of contact and collision due to bumps and knocks.

The array of heads may take any convenient shape but it is preferably the same size and shape as the information storage area. Preferably the head array is substantially smooth.

Preferably systems in accordance with the above aspect of the invention are arranged to oscillate in one dimension only.

The ratio of number of bits of information which may be stored on the magnetic medium and the number of heads in the array will give a nominal number of bits per head. Preferably the mutual oscillation between storage medium and the heads is arranged to have an amplitude such that each head sweeps over this nominal number of bits. In other words each bit of storage is associated with just one head. This makes addressing and retrieval of the required information particularly quick and simple.

Most preferably the number of bits per head corresponds to a predetermined data block size—e.g. as used by an associated computer operating system. For example in one embodiment there are 4 Kilobytes of data storage for each head to associate with a 'page' of memory as used with mainframe installations. In another embodiment this data block size is 512 bytes as used in personal computers. As in accordance with the first aspect of the invention it is preferred that the array of heads is substantially in contact with the information storage medium in use.

By using a large number of heads (as defined hereinbelow) there is no need for a piece of data to be 'located'—it may simply be assumed to be within the relatively limited travel of the corresponding head.

Any convenient means may be provided to drive the relative oscillatory motion—e.g. a piezo-electric drives or a linear motor or manually driven mechanical action. In some envisaged embodiments a stack of piezo-electric actuators could be used to drive an information storage medium directly rather than relying on the bending of a single actuator. This would allow a greater oscillation frequency to be achieved.

In a preferred embodiment a linear rectangular surface is oscillated. In many ways this produces a similar effect to continuous rotation but there is a single area of the storage medium in registration with each head. At an example frequency of 215 Hz this would result in a latency of 1.2 milliseconds with no physical seek because each head moves over its data area twice (in opposite directions) during each oscillation. This assumes that data may be read equally either from the most significant bit or from the least significant bit.

Models have shown that embodiments of the invention with 16 channels can achieve a data transfer rate of 8 Megabytes for each information storage surface.

If, as in accordance with a preferred embodiment, the device comprises a pair of contra-oscillating information storage media with head arrays facing each of the resulting four media surfaces, a random access read or write data transfer rate of 32 Mbs is possible. Indeed since reading and writing may be performed simultaneously, a maximum aggregate data transfer rate of 64 Mbs is theoretically possible.

A general principle to be appreciated in accordance with the invention is that with a large array of heads very direct addressing of relatively small data storage areas is achieved (e.g. 512 bytes in the example given above). This means that data transfer rates referred to above are for 'true' randomly accessed data. This is to be contrasted with prior art continuously rotating disks in which high bit transfer rates may be achievable or quoted, but these are in fact comprise 'bursts' of data read from the vicinity of the required data and in fact only a tiny proportion thereof represents the data actually sought (except in special circumstances e.g. large database copies, backups, database sweeps etc.

Connection

Whatever arrangement an information storage apparatus in accordance with the invention takes, preferably the apparatus includes means to transfer information to or from the read/write heads provided. Such means may take any suitable form and conventional means may be suitable. In a conventional disk drive which employs a rotatable arm, the head that is attached to the arm is typically soldered, pressed or laser welded to electrical connectors through which data can be transferred and such arrangements may be suitable for use with the present invention. Preferably, however, due to the large number of read/write heads that may be provided, the read/write heads are formed by deposition onto a glass ceramic wafer which can then be formed with suitable connecting means using known technology.

The geometry of the surface during manufacture may be used to provide the required thin films in the optimum geometry for reading and writing data. For instance it may be more effective to sputter the thin films at a right angle or other useful angles to the general plane of the surface onto the recessed perpendicular face of a part of the main surface, rather than building the layers for the read/write heads directly onto the plane of the surface.

It may also be preferable to provide some form of local signal processing/connection management to efficiently transfer data to and from the read/write heads. In particular, where a number of sets of read/write heads are provided, addressing can be managed as a mapping of the physical structure of the head arrangement In general therefore it is preferred to provide a matrix of connections to the head assembly. The use of a matrix to communicate with the heads gives a large number of possible access paths. For example, 1024 parallel head arrays, would give 16×64 bit paths/simultaneous bandwidth potential. This increases the dimensionality of data access during a given access cycle from one to two and potentially more dimensions.

Tracking

In fixed forms of information storage media, such as the hard drive of a computer, a disk can be accurately and permanently positioned so that the tracks of the disk are correctly aligned with the read/write heads of the drive. The invention however is also suitable for use with removable forms of information storage media. In the case of removable media, such as removable magnetic or optical disks, the disk is usually placed in some form of carrier or tray in which the disk has a limited degree of free movement. Preferably, therefore, the information storage apparatus includes some form of tracking means to adjust the positioning of the read/write heads of the drive so that each head is correctly aligned with its particular track on the storage medium.

The adjustment provided by the tracking means may be achieved by any suitable arrangement but preferably adjustment is achieved by use of one or more piezoelectric elements as currently available in nano-positioning technology.

It is believed that this arrangement is novel and inventive in its own right and thus when viewed from a further aspect the present invention provides an information storage apparatus comprising a plurality of read/write heads arranged such that in use data can be read from or written to an information storage medium, wherein in use the position of one or more read/write heads is adjustable by means of one or more piezoelectric elements or the entire detector surface to enable the alignment of the read/write heads and the tracks of the medium to be adjusted.

In one embodiment contemplated this could be on a constantly monitored feedback loop mechanism which would adjust alignment over a different timescale to that for data access.

The piezoelectric element or elements may take any suitable form and suitable forms of piezoelectric element are known. As stated above, the alignment of any number of the read/write heads present may be adjusted by any number of piezoelectric elements and heads may be adjusted individually but preferably, due to the large number of heads that may be provided, a number of heads are adjusted together by one or more piezoelectric elements. More preferably, the position of all of the read/write heads can be adjusted together by one or more piezoelectric elements.

In one arrangement, the structure or element on which the read/write heads are mounted may be acted on by one or more piezoelectric elements to cause a degree of deformation of the supporting structure or element such that the heads mounted thereon undergo movement and can be adjusted in position. Thus, if the read/write heads are mounted on a generally elongate support which spans across the tracks of a disk, the piezoelectric element(s) may act to place the elongate support under tension or compression so that the position of all of the read/write heads can be altered to provide tracking adjustment.

In accordance with any of the foregoing aspects of the invention the information storage medium and/or head array may be an integral part of the information storage apparatus or may be removable therefrom—e.g. as a cartridge or the like. Means for moving the information storage medium and head array relative to one another may be provided within such a cartridge, or drive may be provided by the fixed part of the apparatus.

Where reference is made herein to a large number or large array of heads, this is intended to mean at least 100 heads, preferably at least 1000 heads, more preferably at least 10,000 heads and most preferably at least 1,000,000 heads. Indeed a preferred embodiment of the invention has over 64 million heads in a rectangular array of 1024 long by approximately 64 thousand wide.

BRIEF DESCRIPTION OF THE DRAWINGS

Certain preferred embodiments of the invention will now be described, by way of example only, with reference to the accompanying drawings in which:

FIG. 3 shows schematically the spiral arrangement of the data detector heads;

FIG. 4 shows a schematic close-up sectional view of a pair of detector heads from the head array;

FIG. 5 is a schematic diagram showing connections to the heads;

FIG. 6 is a schematic diagram showing connections to the heads on the head array disk;

FIG. 7 shows a schematic close-up view of a detector head;

FIG. 8 shows part of an array of the heads of FIG. 7;

FIG. 9 is a schematic diagram showing connection of the heads to a switch assembly;

FIG. 10 shows a cross-section through the information storage medium and detector array of a further embodiment of the invention;

FIG. 11a is a schematic plan sectional view of the embodiment of FIG. 10;

FIG. 11b is a schematic side sectional view of the embodiment of FIG. 10;

FIG. 11c is a schematic end view of the embodiment of FIG. 10;

FIG. 12a is a schematic plan sectional view of another embodiment;

FIG. 12b is a schematic side sectional view of the embodiment of FIG. 12a;

FIG. 12c is a schematic end view of the embodiment of FIGS. 12a and 12b;

FIG. 13 is a schematic side sectional view of another embodiment with two sliders;

FIG. 14 is a schematic side sectional view of yet another embodiment with two sliders;

FIG. 15 is a schematic side sectional view of another embodiment with a removable slider cartridge;

FIG. 16 is a schematic side sectional view of yet another embodiment with a removable slider cartridge;

FIGS. 17a and 17b are schematic plan and sectional view of another embodiment operated by a manual winding mechanism;

FIGS. 18a and 18b are schematic plan and sectional view of another embodiment operated by a manual push spring mechanism;

FIGS. 19a and 19b show sectional and plan views respectively of another read and write head;

DETAILED DESCRIPTION OF PREFERRED EMBODIMENTS

Figure 1:
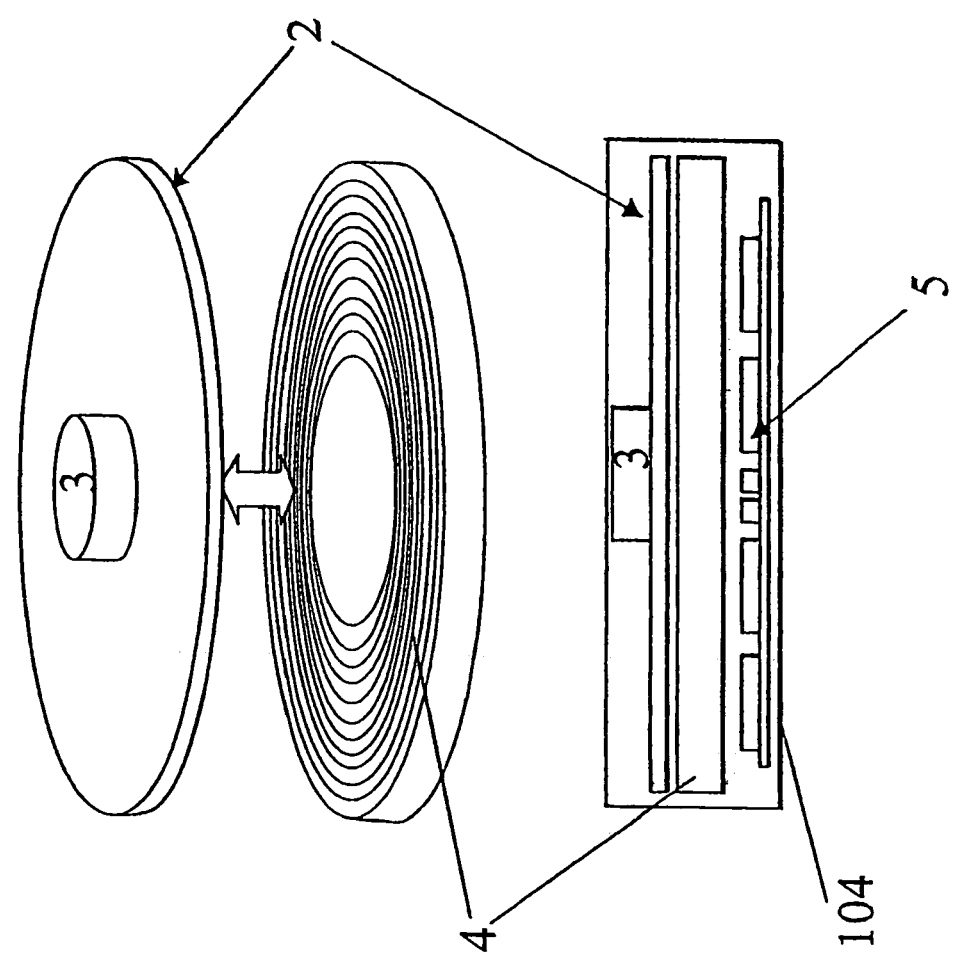
FIG. 1 is a schematic view of an information storage apparatus in accordance with the invention.

Turning firstly to FIG. 1 there may be a seen a schematic representation of an information storage apparatus in accordance with a first embodiment of the invention. The main components of the system are a glass ceramic disk 2 made of zero expansion glass on which is provided a magnetic coating, an array of read and write heads provided on a second glass-ceramic disk 4, a drive mechanism 3. These are provided in a sealed case 104 along with a certain amount of disk controller hardware 5 is also provided.

Figure 2:
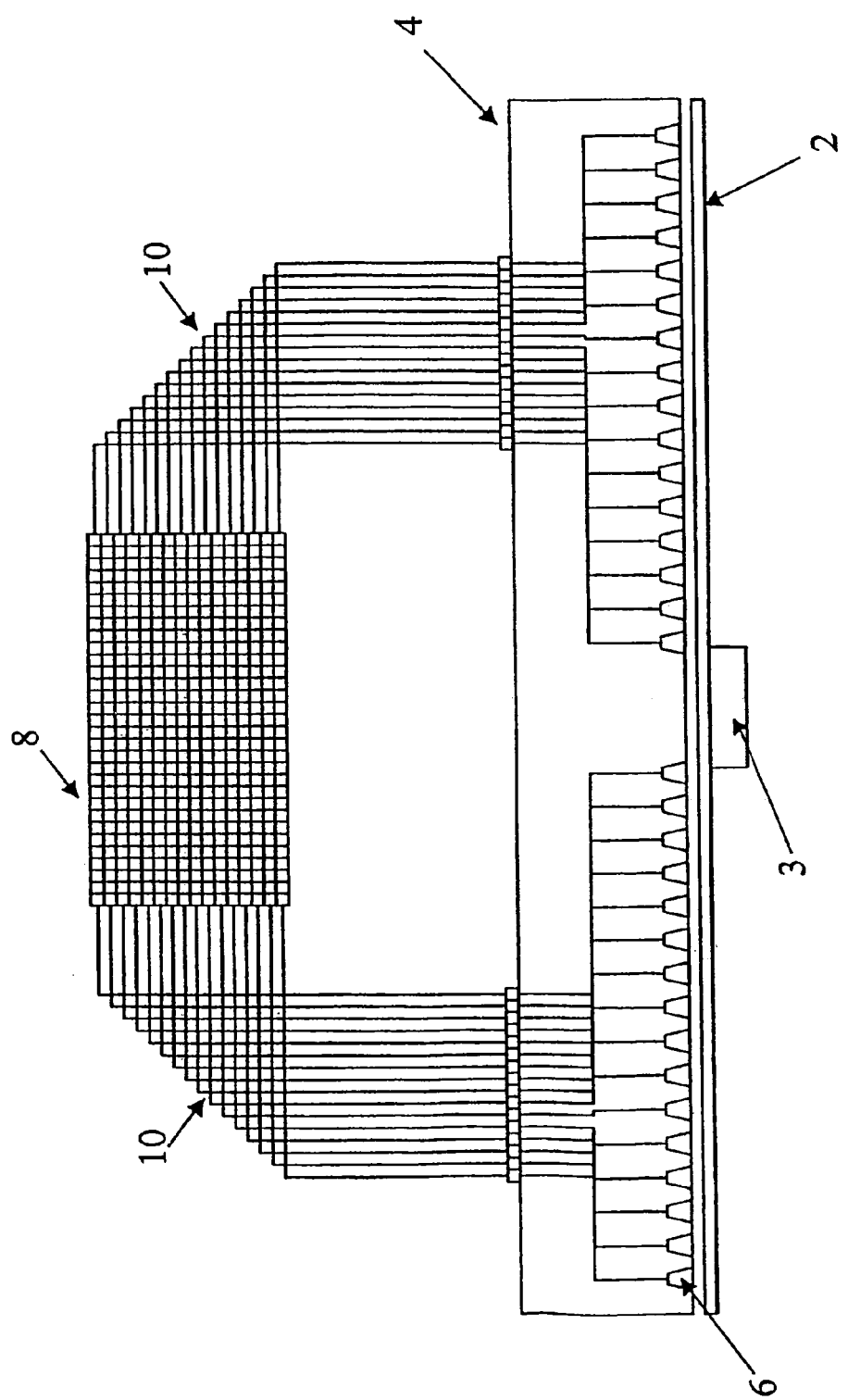
FIG. 2 is a schematic sectional view of a storage platter and detector array in accordance with the invention.

FIG. 2 shows a schematic cross section through the two disks 2, 4 (shown inverted relative to FIG. 1). The array 4 of data read/write heads are denoted schematically by the reference numeral 6. The heads 6 are each electrically connected to a switch assembly 8 by means of an array of data buses 10. As may be seen in FIG. 1, the heads 6 are arranged in concentric bands on the head array disk 4.

A schematic diagram showing more clearly the arrangement of the read/write heads 6 on the detector array 4 is given in FIG. 3. As may be seen, each of the heads 6 is associated with a single data track 14 which extends in a circle around the surface of the magnetic storage disk 2. Thus the heads 6 are arranged in concentric circular bands as may be seen in FIG. 1. However, as is clear from FIG. 3, the heads 6 in adjacent circular bands are circumferentially offset from one another so that the heads 6 may also be seen as being arranged in a series of concentric spirals 12 (four of which are shown in FIG. 2). It will be appreciated that this spiral arrangement of the heads 6 allows the data tracks 14 to be more closely spaced than is the case if the heads were aligned in radial lines across the tracks. The optimum pitch of the spiral will depend upon the precise shape of the heads 6, but a spiral extending from the inner radius of the disk 2 to the outer circumference is envisaged.

Turning to FIG. 4, there may be seen a cross-sectional view through the two disks 2,4 showing two head assemblies 6 in greater detail. Firstly a pair of matching glass-ceramic disk substrates 112,119 is fabricated from a "Zero Expansion" glass such as is available from Schott Glas. Another material having very low thermal expansion may be chosen instead for the substrates, for example titanium silicate glass such as Ultra Low Expansion (ULE) glass available from Corning, Inc. As well as the extremely low thermal expansion coefficient of the two substrates, they are of the same size, shape, thickness and material to minimise further any potential for thermal misregistration between them in use. It is not essential however that all of these parameters e.g. thickness are the same.

The substrate 119 for the data disk 2 is then sputter coated with two layers of magnetic medium with a layer of ruthenium a few atoms thick sandwiched between them to give an anti-ferromagnetically coupled medium layer 118. This structure is similar to the well known "Pixie Dust" arrangement produced by IBM although other techniques of coating media using thin films known to those in the art could be used. The magnetic medium layer 118 is then covered with an ultrananocrystalline artificial diamond layer 117 of the order of 2.5 microns in thickness, which is deposited by chemical vapour deposition as is known in the art. This provides a very tough, wear resistant surface but with a very low coefficient of friction for example of the order of 0.001 in dry nitrogen.

The head array disk is built up first by applying a matrix of electrically conductive connectors 113,114 for the head assembly. For example, a copper or silver based ink may be printed onto the surface of the glass disk or lithographic etching may be used. These may be seen more clearly in the schematic of FIG. 5. Lithographic etching is used to form the head assemblies 6 and connections 120 to the matrix 113,114 in a support layer 110 as is well known in the art of microprocessor fabrication. Magnetically and electrically inert spacer regions 111 are formed between adjacent head assemblies. Adjacent some head assemblies 6 a space is formed to allow the thin film fabrication of the read/write heads at right angles or another empirically determined useful angle.

A 2.5 micron layer of ultrananocrystalline artificial diamond 116 is also deposited onto the head assemblies by chemical vapour deposition as for the storage disk onto the heads.

The external electrical connections to the head assemblies 6 may be seen in FIG. 6. The heads are shown enlarged many times for the sake of clarity and the arrangement is therefore purely schematic. As may be seen, each head assembly 6 is connected at each node between the radial and azimuthal branches 113,114 of the matrix. The radial branches 113 each terminate at the edge of the head array disk 4. Connection to the azimuthal conductors 114 is via plated holes 123 through the glass-ceramic substrate 112 as is common for printed circuit boards and the like. Each head is therefore uniquely addressable by its track number and circular band number.

Referring again to FIG. 1, the two disks 2,4 are mounted around a common spindle (not shown for clarity) the data storage disk 2 being mounted to the spindle to be rotated thereby and the head assembly disk 4 being held stationary so that the spindle rotates relative to it. This gives the required relative rotation between the two disks, but allows the necessary electrical connection to be made easily to the disk. The disks are mounted so that their respective facing surfaces are in contact with one another via the respective diamond-like layers 112,119.

A motor 3 is provided to rotate the information storage disk 2. Since in the preferred embodiments the relative rotational speed of the two disks is of the order of a few revolutions per minute (r.p.m.) as opposed to several thousand r.p.m. as in prior art hard disk drives, the motor may be relatively very low powered and it is even envisaged that a clockwork rotary drive could be employed. The motor 3 is shown as driving the magnetic disk 2 directly, but of course an indirect drive using a belt, chain, gears or the like could also be employed.

Furthermore, the low rotational speeds means that frictional heating and wear are dramatically reduced and indeed with the materials described herein for the disks, coatings and lubricant, a mean lifetime at least comparable with known devices is achievable.

However since the information storage disk and the head array disk are in full contact, previously known problems associated with head crash are obviated, thereby making the device described herein significantly more robust.

Turning to FIG. 7, there may be seen a schematic close-up view of a read head 6. This is a known giant-magneto-resistive head which comprises two layers of magneto-resistive material such as a nickel-iron alloy in which one of the layers is 'pinned' to give a fixed magnetic orientation. The other magneto-resistive film has a free orientation that may therefore be aligned with the magnetic field of the disk surface directly beneath it. When the magnetic orientation of the disk surface causes the variable field layer to align with the pinned layer, conduction electrons with spin parallel to the magnetic field in both layers are relatively unimpeded in their travel through the two layers and thus the overall electrical resistance is relatively low. Conversely in the face of an oppositely directed magnetic field, electrons with spins in the opposite direction to the field undergo relatively more collisions with the metal atoms and so the resistance is increased and may be easily measured.

An alternative embodiment of a read/write head is shown in FIGS. 19a and 19b. The head 70 broadly comprises an electromagnetic induction frame 72, a read head 74 and a magnetic shield 76. A wire coil 78 is wrapped around the upper part of the induction core 78 and has connections 113a,114a to the data buses. The read head 74 similarly has two connections 113b,114b. The tip portion 72a of the induction frame and the tip of the read head 74 are in close proximity to one another and to the magnetic medium surface 80. As may be seen in the plan view of FIG. 19b, by applying current pulses to the coil 78, flux changes my be made in the magnetic medium layer 80. These are shown schematically by the numeral 82 in FIG. 19b. The flux changes 82 may subsequently be read by the read head 74 to generate a signal at the electrical connections 113b,114b to be passed to the data buses.

Returning to FIG. 7, the two electrical contacts 16 may be seen on either side of the detector gap 18 in which the composite magneto-resistive film structure is exposed. It can be appreciated from FIG. 7 that the detector gap 18 represents only a small proportion of the overall width of the head assembly 6. The detector is capable of detecting flux changes over a distance of the order of 40 nanometres which permits a linear storage density of approximately 25 flux changes or bits per micron.

FIG. 8 shows schematically a portion of the array of heads 6. From this diagram it will be appreciated that the overlapping afforded by the spiral arrangement described with reference to FIG. 2 allows the detector gaps 18 to be minimally offset from one another and therefore the data tracks 14 on the disk 2 to be as closely packed as possible, despite the relatively large width required to make adequate electrical connections.

As is shown in FIG. 1, the disk controller hardware 5 is mounted separately from the head assembly disk 4, but equally it could be formed on it. The disk controller 5 may be of a standard type well known in the art. The only modification that will be required is to take account of the fact that rather than a head being physically moved to the desired sector on the disk, the head corresponding to the desired sector will be addressed and the data it reads fed to the data bus linking the disk controller to the rest of the computer system.

Thus a particular 'page' of data (512, 1024, 2048 or 4096 bytes, depending on the operating system or chosen parameters for the operating system.) will be stored at a given sector on the disk, i.e. a particular angular segment of a given track as is well known in the art. No modification to the operating system of the computer served by the data disk need be necessary since the modifications to a standard data controller necessary to convert a logical data mapping to a head address rather than a physical data mapping may be incorporated into the disk controller and the interface of the disk drive to the processor may be the same format as for current known hard disk drives (albeit simpler).

Figure 10A:
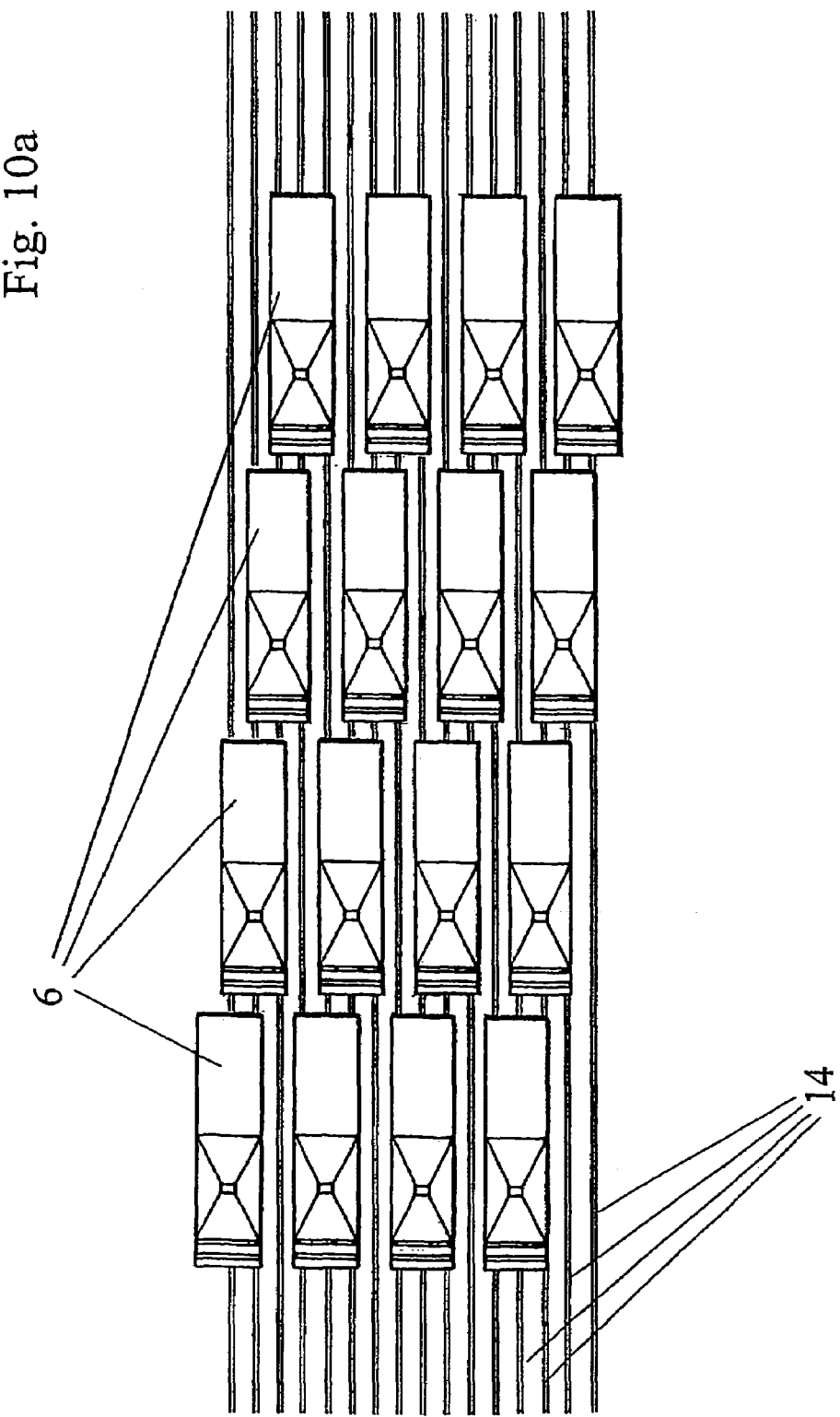
FIG. 10a is a schematic diagram of the offset arrangement of the heads in the embodiment of FIG. 10.

FIG. 9 shows schematically an embodiment in which the data connections 113,114 to the heads 6 are connected to the switch assembly 8 via a series of inline amplifiers 146 in series with the data buses 10. Second and third embodiments of the invention are described schematically with reference to FIGS. 10 to 14. In these embodiments, rather than the information storage medium and head array being provided respectively on a pair of ceramic disks, they are provided on mutually sliding rectangular members 20,22. These are shown in schematic cross section in FIG. 10. As in the first embodiment, the two similarly sized and shaped rectangular substrates 24,26 are made from zero expansion glass-ceramic available from Schott Glas or ULE glass ceramic from Corning Inc. The layers of magnetic medium 28 and ultrananocrystalline artificial diamond or taC, 30 are built up in exactly the same as is described above except that sideways sputtering may be employed to apply the magnetic medium layer.

Similarly, the head assembly 32 is fabricated as described above and is covered with an artificial diamond layer 34. However, in this embodiment, the shape of the two members is such that the data tracks 14' are not arranged in circles or spirals but rather in parallel rows. By analogy with the circular embodiment the heads 6' in adjacent rows are mutually offset so as to enable optimum packing of the heads. The arrangement of heads 6' relative to the data tracks 14' may be seen in FIG. 10*a*. Another difference as compared with the first embodiment is that it is not necessary to provide holes through the ceramic substrate of the head array to make electrical connections to the heads since these may be made at either side of the head sliding member 22.

Considering FIGS. 11*a* to 11*c*, these show respectively schematic plan and side sectional views and an end view of the information storage device. The magnetic data storage member 20 is mounted so as to be able to slide in two side guide channels 36. At one end of the data member 20 is provided a piezo-electric actuator 38 for reciprocating the data member. The piezo-electric actuator is well known per se. The view in FIG. 11*c* from the end opposite the actuator 38 shows the head array member 22 fixed in place above the data member 20. In fact in the embodiment of FIG. 11, two head arrays 22 are provided, the other being below the data member 20. This allows a double-sided data member to be used and therefore double data capacity as compared to the embodiment of FIG. 10. The side guide channels 36 comprise further piezo-electric actuators for providing small intermittent corrections to the lateral position of the data member 20 relative to the head array 22 to ensure optimum signal strength.

The embodiment of FIGS. 12*a* to 12*c* is similar to that of FIGS. 11*a* to 11*c* except that instead of a piezo-electric actuator at one end of the data member 20, magnetic linear motors 109 are provided along the inside of the guide channels 36.

FIGS. 13 and 14 show schematic cross sections of further embodiments corresponding respectively to FIGS. 11 and 12, except that a pair of the data member and head array arrangements provided in the earlier embodiments is provided in each case in a sealed case 4. In use anti-phase sawtooth voltage waves are applied to the respective actuators 38; 109 for reciprocating the two data members 20 in opposite directions. This means that the units as a whole are less prone to physical vibration as there is no net momentum.

FIGS. 15 and 16 show yet further embodiments of the invention in which the data member and head array assembly is removable. Turning firstly to FIG. 15, there may be seen two read/write head array members 22' on either side of a data member 20' contained within a cartridge 40 which may be removably inserted into a suitable socket in the main housing 50. At the insertion end of the cartridge 40, a drive coupling member 53 s connected to one end of the data member 20' and penetrates the cartridge 40 in order to allow it to couple to a piezo-electric reciprocating motor 55. This could, for example, be a magnetic or physical 'plug' coupling. Data bus connectors 54 also penetrate the cartridge 40 to establish an electrical connection between the head arrays 22' and the device controller and interface circuitry 56. Thus in use a cartridge 40 may be inserted into the housing 50 and the date slide may operate as in the previous embodiments with the slide 20 itself being reciprocated by the motor 55 by means of the coupling 53.

FIG. 16 shows an alternative embodiment in which linear actuators 109' are provided for moving the data member 20" as in FIGS. 12*a*-12*c* and 14. In this embodiment no external coupling to the data member 20" is necessary and thus only electrical connections 54' to the head arrays 22' are required. These electrical connections are also used to power the linear motors 109.

FIGS. 17*a* and 17*b* show schematically a further embodiment of the invention which is designed to hold a pre-written or read only disk 84 without any external motive power being necessary. The disk 84 is rotated by the unwinding of a previously wound spring (not shown) which is governed by a ratchet mechanism 86. This turns a support table 88 which spins on a freely rotatable spindle 90. A radial arm 92 comprising a line of read heads extends across the storage area of the disk 84 with one head per data track. The ratchet mechanism 86 can be configured to provide motive power just sufficient for exactly one revolution. This would be able to provide any data from any portion of the disk at one pass.

FIGS. 18*a* and 18*b* show a similar embodiment to that of FIGS. 17*a* and 17*b*, but in this embodiment the information storage medium is in the form of a rectangular member 94. There is a corresponding rectangular array 96 of read heads. The head array 96 is fixed relative to the casing 98 and the information storage member 94 is mounted to slide longitudinally relative to it. The data member is coupled to one end of the casing by a compression spring 100. Mounted to the other end of the data member 94 is a mounting block 103 on which is provided a push button 102. Thus in use, as in the previous embodiment, data may be retrieved in a single pass simply by depressing the button 102 and releasing it. This will ensure that each data bit is passes over at least one read head.

EXAMPLE 1

A particular practical example of the circular embodiment described above is now given. The usable band of magnetic material on the information storage disk 4 has an inner diameter of approximately 40 mm and an outer diameter of approximately 120 mm. The read/write heads on the corresponding head array disk are therefore arranged in spirals extending in a single revolution from an inner to an outer diameter which diameters correspond to the dimensions of the band of magnetic medium.

The length L of a single revolution spiral extending from the inside diameter to the outside diameter of a circular disk is given by the formula:

$$L=\pi(D_i+D_o)/2$$

where $D_i$=inner diameter $D_o$=outer diameter

For a disk with an inner diameter of approximately 40 mm and an outer diameter of approximately 120 mm the length of each spiral track is therefore approximately 250 mm.

The size and shape of the heads and the pitch of the spirals are such as to allow a radial spacing of the heads of approximately 2.5 microns and a minimum circumferential spacing between the heads on adjacent spirals of approximately 100 microns.

The radial extent of the usable surface of the disk is 60−20=40 mm. Multiplying this by the radial spacing above gives a total of 16,000 circular data tracks on the disk. The shortest of these is clearly at the inner diameter which has a length of pi×$D_i$=pi×40 mm=126 mm. Since each head corresponds to one data track, this means that each spiral has 16,000 heads.

Using current disk fabrication technology and head sensitivity, a bit density of 25 bits per linear micron of track is achievable. This means that each track may have at least 5,040,000 bits or 630,000 bytes. Since the minimum spacing between the heads on adjacent spirals is only 100 microns, theoretically there would be space for 1260 spirals. However this would mean that each head would sweep only 630,000/1260=500 bytes.

Whilst arranging for 512 bytes per head would be more a little more convenient, substantially more convenient would be to have 4096 bytes or 4 kilobytes per head since in the majority of currently known operating systems, this corresponds to a block or page of data. Thus in the present example there are 153 spirals and a slightly lower bit density than 25 per micron such that there are 626688 bytes or 4096 per head provided.

With each track having a data capacity of 612 kilobytes, the capacity of the disk as a whole is 16,000×612 kB=9.79 Gigabytes which is of the same order as currently used hard disks.

If the disk described above is mounted to rotate 1 revolution per second, a particular physical data address will pass 153 heads every second. The spin latency is therefore between 0 and 1/153=6.5 milliseconds. Since all of the heads are permanently aligned with their respective tracks there is no further physical latency and thus the average seek time is 3.25 milliseconds. By way of comparison, a spin speed of 15,000 revolutions per minute is necessary to achieve s similar seek time in the conventional single head disk design. This is considered to be at the limits of the physical strength of available materials under the considerable centripetal force necessary for such a speed.

The maximum relative linear velocity between the head disk and the data disk is pi×120 mm/1 second=0.38 metres per second. Clearly this is a tiny fraction of the speed encountered with currently known systems involving spin speeds of many thousands of revolutions per minute.

EXAMPLE 2

A particular example of the rectangular embodiment described above will now be given. In this example the length of the area of the magnetic medium 28 is 165 mm and the width is 25 mm.

As in Example 1 the size and shape of the heads and the pitch of the mutual offset between adjacent rows are such as to allow a lateral spacing of the heads of approximately 2.5 microns and a longitudinal spacing between the heads on adjacent rows of approximately 820 microns. This therefore allows for 10,000 heads per row and 200 rows—i.e. a theoretical 2 million heads in total.

The number of heads in each row corresponds to the number of parallel linear tracks, and there are therefore 10,000 data tracks extending the length of the data member. With a data storage density of 25 bits per linear micron as in the circular embodiment of Example 1, there are a total of 25×150×100=3.75 million bits. Thus if the maximum number of rows were employed each head would cover approx. 4000 bits. However, as before, it is preferable that each head covers a standard page of data, i.e. 4096 bytes (32768 bits) and thus 200 rows of heads are provided.

The total data capacity of the slide is therefore 200×4096×10,000 bytes=200×4×10,000 Kilobytes=8 Gigabytes. Clearly this would be doubled if a double-sided slide were to be employed.

The average seek time will of course depend upon the frequency and amplitude of reciprocation of the slide. For example at a frequency of 100 Hz and amplitude equal to the longitudinal spacing between heads, the slide will execute a full cycle, of linear movement of 4096×80/40=820 microns every 10 milliseconds. However, it will be appreciated that unlike rotation, with reciprocating oscillation, each bit within the sweep of a given head will be passed twice during each cycle. Thus each bit will be aligned with the head every 5 ms. The average seek time is therefore 2.5 ms which is even better than the 3.25 ms time for the rotating embodiment described above. A sweep time of 5 milliseconds and a sweep amplitude of 820 microns implies a relative linear speed between the data and head sliders of 0.16 meters per second. This is less than half the maximum relative speed encountered in the rotational embodiment of Example 1. Furthermore, the relatively long, thin shape of the slides means that the most significant component of any thermal expansion that takes place will be longitudinal—i.e. in the direction of oscillations. However potential misregistration in this direction may be automatically avoided by taking advantage of the well known algorithms already employed in rotating disk systems to account for the differing length of tracks at different radii on the disk.

Figure 20:
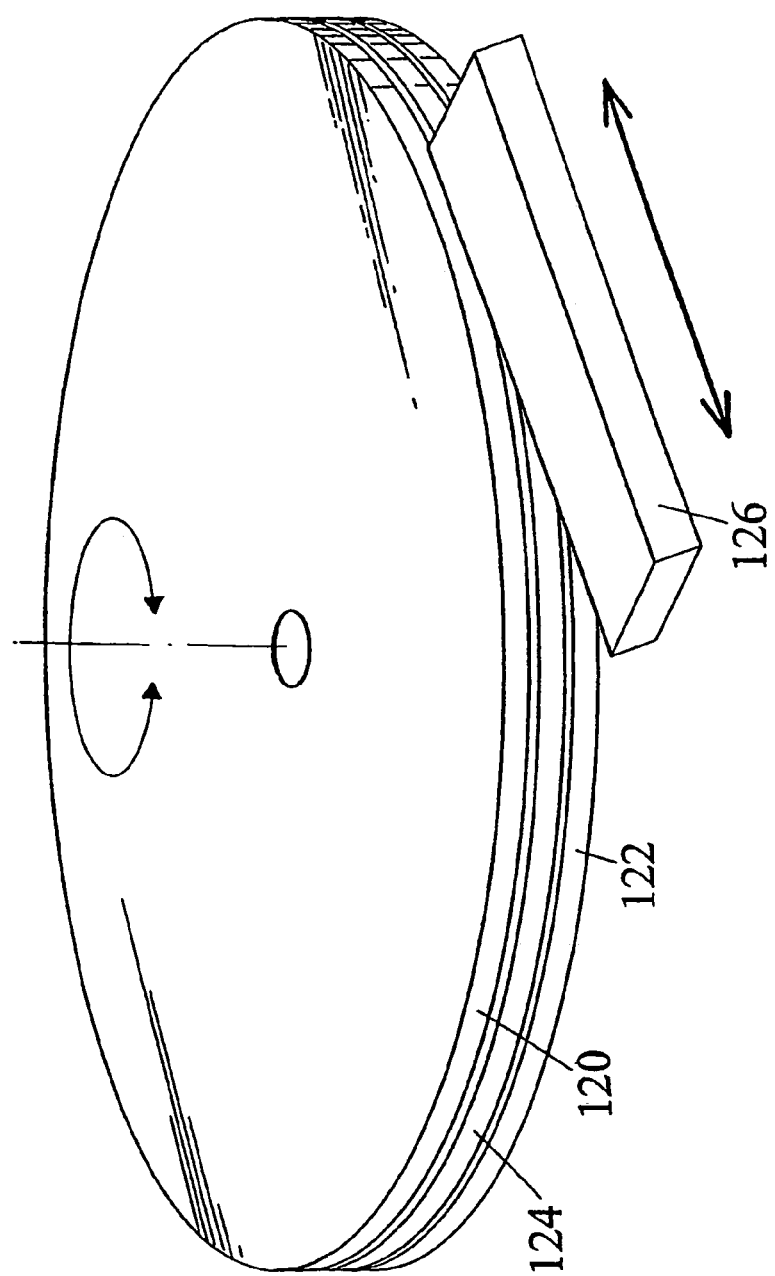
FIG. 20 is a schematic perspective view of an alternative embodiment in accordance with the invention.

A further possible embodiment is shown schematically in FIG. 20. In this embodiment two magnetic information storage disks 120, 122 fabricated according to the principles described hereinabove confront a double-sided head array disk 124, also fabricated according to the principles described hereinabove. The head disk 124 is held still and the two media disks are attached to a piezo-electric actuator 126 which periodically expands and contracts as is shown by the double-headed arrow. Thus rather than being rotated continuously as in conventional hard disk drives, the two disks 120, 122 are oscillated about their common axis so that each head on the head array 124 addresses a fixed area on the media disks. It will be appreciated therefore that this is a functionally very similar arrangement to the rectangular slider embodiments previously discussed.

Figure 21A:
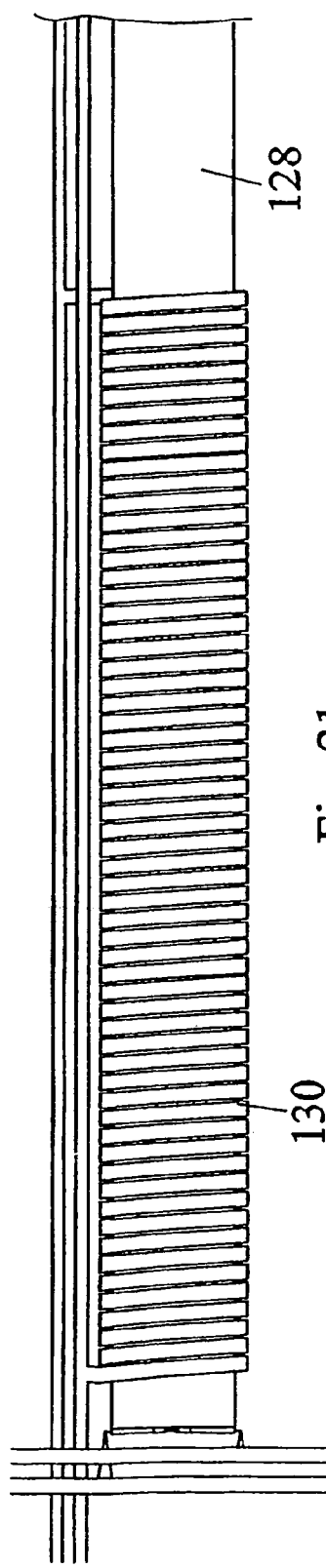
FIGS. 21a and 21b are detailed views or a read/write head assembly.

A preferred embodiment of a read/write head for use in accordance with the invention will now be described with reference to FIGS. 21a, 21b and 22. FIG. 21a shows a plan view of the read/write head assembly wherein the magnetic core 128 and the helical copper winding 130 may be seen. There are typically approximately 60-65 turns on each arm of the winding 130a, 130b.

Figure 21B:
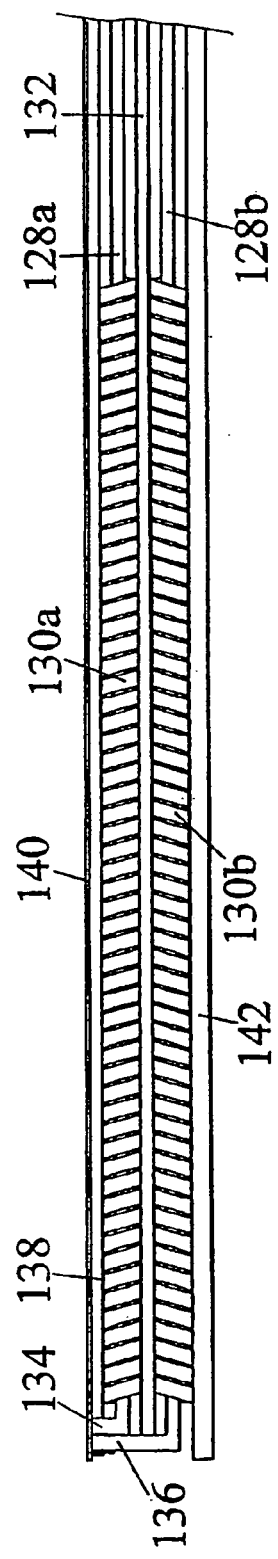

As is apparent from the side elevation of FIG. 21b, the core 128 has a general elongated U shape with copper windings 130a, 130b around the top and bottom arms 128a, 128b of the core respectively so that the inner long edges of the windings 130a, 130b face each other. A magnetic shield layer 132 is provided between the windings to prevent interference between them.

The two arms of the core 128a, 128b are bent upwardly adjacent one another to form a write head 134 and a read head 136 respectively. A glass filler layer 138 is formed around and flush with the heads 134, 136 and a further layer of glass 140 is formed over the whole assembly. The two glass layers could, for example be ULE glass available from Corning Inc or 'Zerodur' from Schott Glas. The head assembly is supported on a substrate layer 142 also of such a glass.

Figure 22:
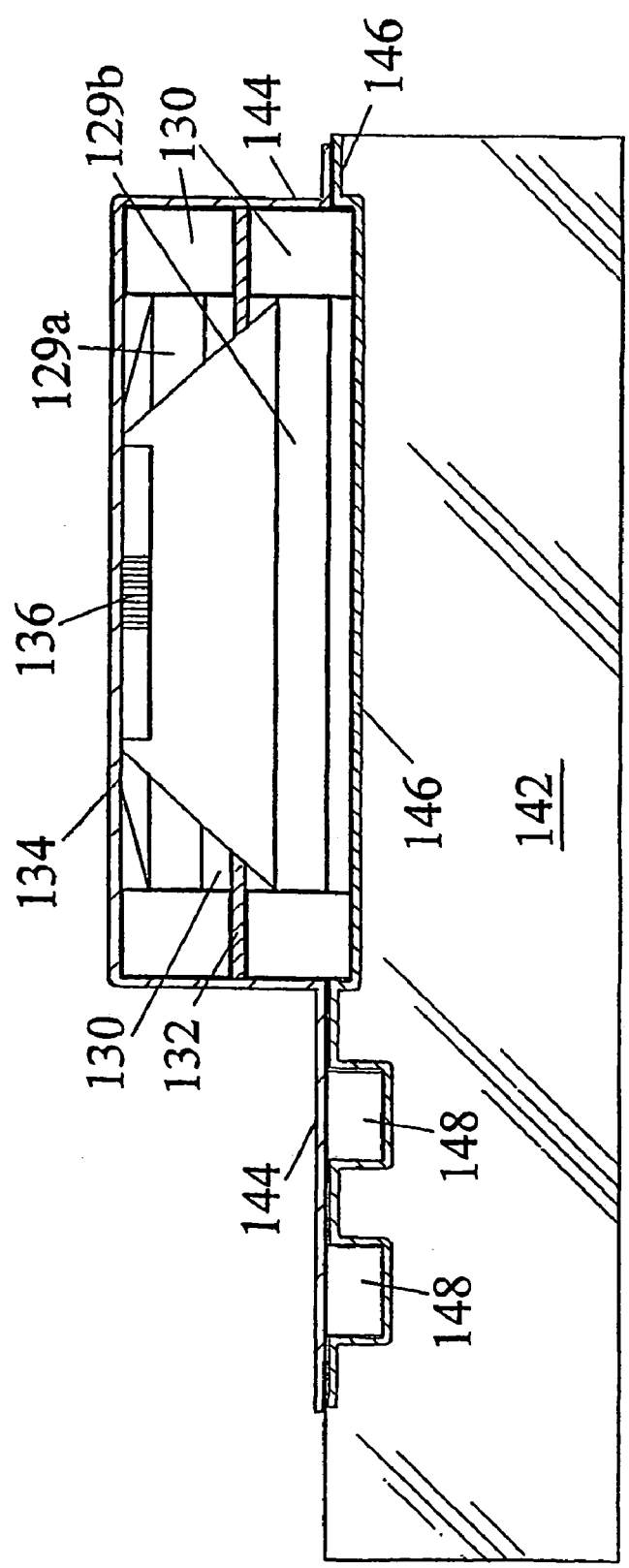
FIG. 22 is an even more detailed view of a read/write assembly.

A more detailed view of the arrangement of the heads is shown in FIG. 22. The upstanding ends 129a, 129b of the two arms 128a, 128b of the core have diagonally truncated shoulders such that the width of their end surfaces facing the magnetic medium are less than the widths of the rest of the arms 128a, 128b.

When viewed end-on as in FIG. 22, the foremost core end 129b is formed with a small, backwardly sloping section, the angle of which may be between forty five and ninety degrees to the top of the end piece 129b. This sloping section defines the read head 136.

The write head 134 is simply defined by the end face of the other end piece 129a (partly obscured in FIG. 22). The magnetic shield 132 extends between the respective copper windings 130. Two signal tracks 148 are shown formed in grooves in the glass substrate as this has been found to reduce capacitance effects. However this is not considered essential and they could instead be surface mounted.

A tetrahedral amorphous carbon coating 144 is formed over the head assembly and substrate 142 whilst a dielectric coating 146 separates the head assembly and signal tracks 148 from the substrate 142. An example pitch of the overall head assembly including signal tracks 148 is 17 microns. This is the minimum spacing between adjacent heads. Although 17 microns is typical, much smaller values are possible—e.g. at least an order of magnitude smaller. An example width of the actual head assembly itself is 12 microns and an example height above the substrate surface is 4.5 microns.

Figure 23:
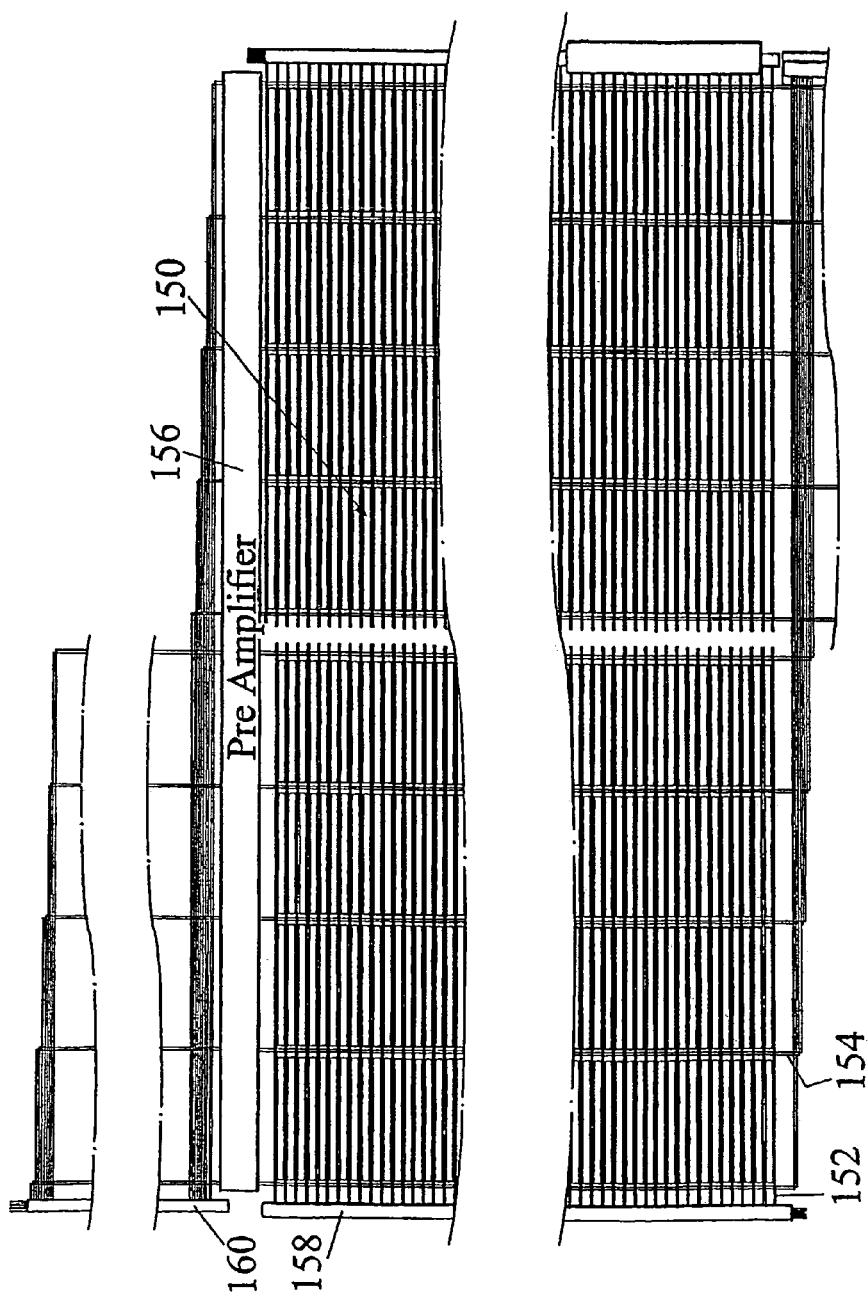
FIG. 23 is a schematic view of an array of heads.

FIG. 23 shows schematically part of an array of head assemblies 150. These may be as shown in the previous two Figures but equally may have other configurations. Each head assembly 150 has row and column signal connections 152, 154 at either end. This duplication provides valuable redundancy to protect against isolated failures. Each column signal connection 154 actually comprises separate read and write connections to the read and write heads thereof respectively allowing simultaneous reading and writing of data.

The column signal connections 154 on one side of the array pass through a preamplifier shown schematically at 156 but formed by solid state components formed by suitable masks during the head fabrication process. Row and column decoders 158, 160 provide basic pre-processing of data read. Although not visible in FIG. 23, these are repeated at the other side of the array.

Figure 24:
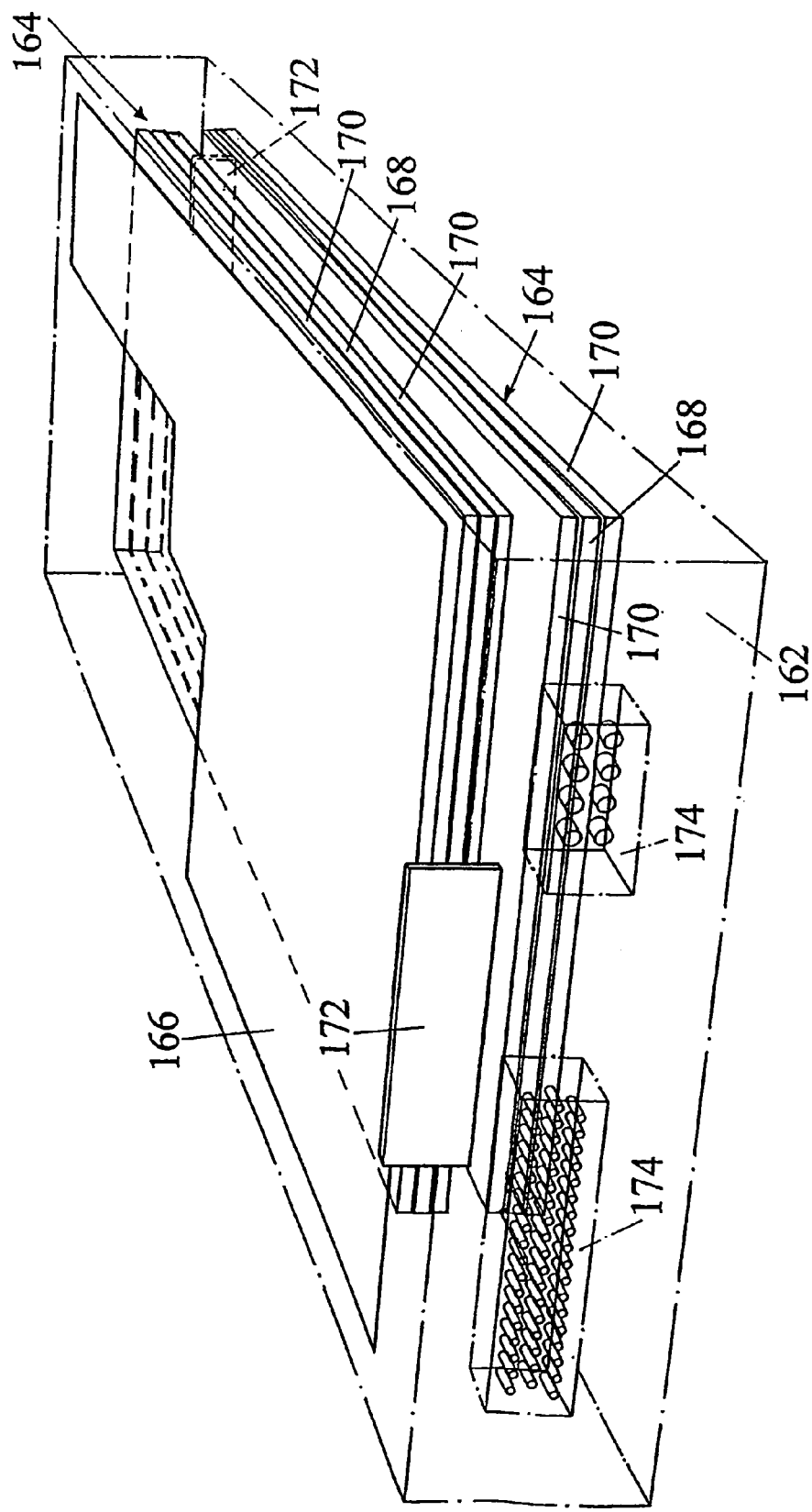
FIG. 24 is a schematic perspective view of an information storage apparatus of another embodiment of the invention.

FIG. 24 shows a data storage apparatus in accordance with the invention. Specifically it has an outer casing 162 which houses two independent slider arrangements 164 and control circuitry 166. Each slider arrangement 164 comprises a rectangular central information storage member 168 and a pair of head arrays 170 opposite the two faces of the storage member 168 and sized to match it.

The data storage member 168 and head arrays 170 may be fabricated in accordance with any of the principles set out hereinabove. The head arrays thus each comprise many thousand individual heads.

The two information storage members 168 are attached to respective piezo-electric actuators 172. The piezo-electric actuators are at opposite ends of the two slider arrangements 164 and are arranged to oscillate them in anti-phase so as to minimise the overall vibration induced in the casing 162. The four head arrays 170 are connected to the control circuitry 166 which is in turn connected to external plugs 174 for connection to a data processing system—e.g. a personal computer.

It will be appreciated by those skilled in the art that only certain very specific embodiments and examples of the invention have been described above and in fact the principles of the invention may be implemented in many different ways. For example the data surface and head array surface need not be circular or rectangular—nor even planar. Indeed it is envisaged that any reasonable shape could be employed.

What is claimed is:

1. An information storage apparatus comprising:
   a storage medium;
   a head assembly having:
   a substantially planar surface; and
   a plurality of read/write heads;
      wherein the read/write heads are arranged substantially in the plane of said planar surface and wherein said information storage medium and said head assembly are arranged in mutually sliding abutment such that said read/write heads are substantially in sliding contact with the outer surface of the information storage medium in use; and
   the storage medium and the head assembly comprise a substrate of glass having a coefficient of expansion less than 1 nm per 100 mm per Kelvin temperature rise and having a sufficiently low thermal expansion that in use thermal misregistration between the storage medium and the head assembly does not take place.

2. An information storage apparatus as claimed in claim 1 wherein said heads are provided on a monolithic layer.

3. An information storage apparatus as claimed in claim 1 wherein the heads are fixed in position and the information storage medium overlies the heads and wherein a lubricating layer is provided therebetween.

4. An information storage apparatus as claimed in claim 3 wherein said lubricating layer comprises a self-lubricating layer on at least one of the storage medium and head array.

5. An information storage apparatus as claimed in claim 4 wherein said self-lubricating layer comprises an artificial diamond coating.

6. An information storage apparatus as claimed in claim 1 wherein all of the read/write heads are mounted on a single member.

7. An information storage apparatus as claimed in claim 6 wherein said member is generally sized and shaped to correspond to the size and shape of the information storage medium.

8. An information storage apparatus as claimed in claim 7 wherein said information storage medium and said head assembly comprise similar substrates.

9. An information storage apparatus as claimed in claim 7 wherein said storage medium and read/write heads are resiliently biased together.

10. An information storage apparatus as claimed in claim 1 wherein the heads are arranged topologically in a rectangular array.

11. An information storage apparatus as claimed in claim 10 wherein said head array comprises connections to both ends of the rows and columns.

12. An information storage apparatus as claimed in claim 10 wherein said read/write heads are formed by deposition onto a glass ceramic wafer, said wafer being formed with connections to the heads.

13. An information storage apparatus as claimed in claim 1 wherein the head assembly comprises pre-processing and/or pre-amplification circuitry for pre-processing and/or pre-amplifying data read by said heads prior to being output from the head assembly.

14. An information storage apparatus as claimed in claim 1 wherein at least one read/write head is provided for all of the tracks that are available for information storage on the storage medium.

15. An information storage apparatus as claimed in claim 1 comprising a refresh sub-assembly for ensuring that an optimal signal strength is maintained.

16. An information storage apparatus as claimed in claim 15 wherein the refresh sub-assembly comprises a signal strength monitor for monitoring a signal strength available from the storage medium, said refresh sub-assembly means being arranged to rewrite the received signal if the signal strength available falls below a predetermined threshold.

17. An information storage apparatus as claimed in claim 1 wherein the head assembly and information storage medium are resiliently biased towards one another.

18. An information storage apparatus as claimed in claim 1 wherein each bit of storage on said storage medium is associated with just one head.

19. An information storage apparatus as claimed in claim 1 comprising an information transfer sub-assembly to transfer information to or from the read/write heads.

20. An information storage apparatus as claimed in claim 1 comprising a tracking sub-assembly to adjust the positioning of the read/write heads of the drive so that each head is correctly aligned with its particular track on the storage medium.

21. An information storage apparatus as claimed in claim 20 wherein said tracking sub-assembly comprises one or more piezoelectric elements.

22. An information storage apparatus as claimed in claim 21 wherein said one or more piezoelectric elements is/are arranged to adjust the position of all of said heads together.

23. An information storage apparatus as claimed in claim 21 wherein said one or more piezoelectric elements is/are arranged to act on the structure or element on which the read/write heads are mounted to cause a degree of deformation of the supporting structure or element such that the heads mounted thereon undergo movement and can be adjusted in position.

24. An information storage apparatus as claimed in claim 1 comprising an oscillation drive mechanism for oscillating the information storage medium with respect to the head assembly.

25. An apparatus as claimed in claim 24 comprising a piezoelectric actuator for driving said oscillation.

26. An apparatus as claimed in claim 24 comprising two oscillating information storage media or head arrays arranged to oscillate in anti-phase.

27. An apparatus as claimed in claim 24 wherein the information storage medium and array of heads are arranged to oscillate linearly relative to one another.

28. An apparatus as claimed in claim 24 wherein said array of heads and said information storage medium are rectangular.

29. An information storage apparatus as claimed in claim 1 wherein a central portion of said information storage medium forms part of an induction motor.

* * * * *